United States Patent
Mikami et al.

(10) Patent No.: US 11,172,174 B2
(45) Date of Patent: Nov. 9, 2021

(54) IMAGING APPARATUS

(71) Applicant: OLYMPUS CORPORATION, Tokyo (JP)

(72) Inventors: Toshiaki Mikami, Tokyo (JP); Kiyotomi Ogawa, Tokyo (JP); Hideaki Takahashi, Tokyo (JP); Munenori Fukunishi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/900,125

(22) Filed: Jun. 12, 2020

(65) Prior Publication Data

US 2020/0314391 A1 Oct. 1, 2020

Related U.S. Application Data

(63) Continuation of application No. PCT/JP2017/045909, filed on Dec. 21, 2017.

(51) Int. Cl.
*H04N 9/077* (2006.01)
*G03B 11/00* (2021.01)
(Continued)

(52) U.S. Cl.
CPC ............ *H04N 9/077* (2013.01); *G03B 11/00* (2013.01); *G03B 13/36* (2013.01); *G03B 15/03* (2013.01);
(Continued)

(58) Field of Classification Search
CPC .. H04N 9/077; H04N 9/0451; H04N 9/04515; H04N 9/0455; H04N 5/2256;
(Continued)

(56) References Cited

U.S. PATENT DOCUMENTS

2013/0147926 A1* 6/2013 Hiramoto ............. H04N 13/257
348/49

FOREIGN PATENT DOCUMENTS

| JP | 2012-113064 A | 6/2012 |
| JP | 2013-044806 A | 3/2013 |

(Continued)

OTHER PUBLICATIONS

International Search Report dated Mar. 20, 2018 issued in PCT/JP2017/045909.

*Primary Examiner* — Nelson D. Hernández Hernández
(74) *Attorney, Agent, or Firm* — Scully, Scott, Murphy & Presser, P.C.

(57) ABSTRACT

In an imaging apparatus, two pupils of a pupil division optical system transmits light of a first wavelength band and light of a second wavelength band. An amount of components of the first wavelength band in first transmittance characteristics and second transmittance characteristics is more than an amount of components of the second wavelength band in the first transmittance characteristics and the second transmittance characteristics. An amount of components of the second wavelength band in third transmittance characteristics is more than an amount of components of the first wavelength band in the third transmittance characteristics. A processor is configured to generate a color image including a first signal that is based on the first transmittance characteristics as a first channel and a second signal that is based on the second transmittance characteristics as a second channel and a third channel.

7 Claims, 14 Drawing Sheets

(51) Int. Cl.
*G03B 15/03* (2021.01)
*H04N 9/04* (2006.01)
*H04N 5/225* (2006.01)
*H04N 5/235* (2006.01)
*H04N 5/232* (2006.01)
*G03B 13/36* (2021.01)

(52) U.S. Cl.
CPC ......... *H04N 5/2256* (2013.01); *H04N 5/2354* (2013.01); *H04N 5/232122* (2018.08); *H04N 9/0451* (2018.08); *H04N 9/0455* (2018.08); *H04N 9/04515* (2018.08)

(58) Field of Classification Search
CPC ........... H04N 5/2354; H04N 5/232122; G03B 13/36; G03B 11/00; G03B 15/03; G03B 33/10; G02B 7/34; G02B 21/00; G02B 21/36
See application file for complete search history.

(56) References Cited

FOREIGN PATENT DOCUMENTS

| | | |
|---|---|---|
| JP | 2015-011058 A | 1/2015 |
| JP | 2015-012319 A | 1/2015 |
| WO | 2013/021542 A1 | 2/2013 |

\* cited by examiner

| R_00 | Gr_01 | R_02 | Gr_03 |
| --- | --- | --- | --- |
| Gb_10 | B_11 | Gb_12 | B_13 |
| R_20 | Gr_21 | R_22 | Gr_23 |
| Gb_30 | B_31 | Gb_32 | B_33 |

FIG. 10

| R_00 -OB | R_00 -OB | R_02 -OB | R_02 -OB |
|---|---|---|---|
| R_00 -OB | R_00 -OB | R_02 -OB | R_02 -OB |
| R_20 -OB | R_20 -OB | R_22 -OB | R_22 -OB |
| R_20 -OB | R_20 -OB | R_22 -OB | R_22 -OB |

FIG. 11

| Gr_01 -OB | Gr_01 -OB | Gr_03 -OB | Gr_03 -OB |
|---|---|---|---|
| Gb_10 -OB | Gb_10 -OB | Gb_12 -OB | Gb_12 -OB |
| Gr_21 -OB | Gr_21 -OB | Gr_23 -OB | Gr_23 -OB |
| Gb_30 -OB | Gb_30 -OB | Gb_32 -OB | Gb_32 -OB |

| B_11 -OB | B_11 -OB | B_13 -OB | B_13 -OB |
|---|---|---|---|
| B_11 -OB | B_11 -OB | B_13 -OB | B_13 -OB |
| B_31 -OB | B_31 -OB | B_33 -OB | B_33 -OB |
| B_31 -OB | B_31 -OB | B_33 -OB | B_33 -OB |

IMAGING APPARATUS

The present application is a continuation application based on International Patent Application No. PCT/JP2017/045909 filed on Dec. 21, 2017, the content of which is incorporated herein by reference.

BACKGROUND OF THE INVENTION

Field of the Invention

The present invention relates to an imaging apparatus.

Description of Related Art

Imaging devices having color filters of primary colors consisting of R (red), G (green), and B (blue) have been widely used for an imaging apparatus in recent years. When a band of the color filter becomes wide, the amount of transmitted light increases and imaging sensitivity increases. For this reason, in a typical imaging device, a method of causing transmittance characteristics of R, G, and B color filters to intentionally overlap is used.

In a phase difference AF or the like, phase difference detection using a parallax between two pupils is performed. For example, in Japanese Unexamined Patent Application, First Publication No. 2013-044806, an imaging apparatus including a pupil division optical system having a first pupil area transmitting R and G light and a second pupil area transmitting G and B light is disclosed. A phase difference is detected on the basis of a positional deviation between an R image and a B image acquired by a color imaging device mounted on this imaging apparatus.

SUMMARY OF THE INVENTION

According to a first aspect of the present invention, an imaging apparatus includes a pupil division optical system, an imaging device, and a processor. The pupil division optical system includes a first pupil transmitting light of a first wavelength band and a second pupil transmitting light of a second wavelength band different from the first wavelength band. An amount of components of a transmission wavelength band of first transmittance characteristics overlapping the first wavelength band is more than an amount of components of a transmission wavelength band of the first transmittance characteristics overlapping the second wavelength band. An amount of components of a transmission wavelength band of second transmittance characteristics overlapping the first wavelength band is more than an amount of components of a transmission wavelength band of the second transmittance characteristics overlapping the second wavelength band. An amount of components of a transmission wavelength band of third transmittance characteristics overlapping the second wavelength band is more than an amount of components of a transmission wavelength band of the third transmittance characteristics overlapping the first wavelength band. The first transmittance characteristics, the second transmittance characteristics, and the third transmittance characteristics are different from each other. The imaging device is configured to generate a first signal by capturing an image of light transmitted through the pupil division optical system and a first color filter having the first transmittance characteristics. The imaging device is configured to generate a second signal by capturing an image of light transmitted through the pupil division optical system and a second color filter having the second transmittance characteristics. The imaging device is configured to generate a third signal by capturing an image of light transmitted through the pupil division optical system and a third color filter having the third transmittance characteristics. The processor is configured to generate a color image including the first signal as a first channel and the second signal as a second channel and a third channel and is configured to output the generated color image to a display.

According to a second aspect of the present invention, in the first aspect, transmittance in the first transmittance characteristics may be the greatest at a first wavelength. Transmittance in the second transmittance characteristics may be the greatest at a second wavelength. Transmittance in the third transmittance characteristics may be the greatest at a third wavelength. The third wavelength may be other than wavelengths from the first wavelength to the second wavelength.

According to a third aspect of the present invention, in the second aspect, the first wavelength and the second wavelength may be longer than the third wavelength.

According to a fourth aspect of the present invention, in any one of the first to third aspects, the first wavelength band and the second wavelength band need not overlap each other.

According to a fifth aspect of the present invention, in any one of the first to fourth aspects, the processor may be configured to calculate a first coefficient on the basis of the second signal and the third signal. The processor may be configured to generate a fourth signal by correcting, on the basis of the calculated first coefficient, the second signal used for the third channel. The processor may be configured to generate the color image including the first signal as the first channel, the second signal as the second channel, and the fourth signal as the third channel. The processor may be configured to output the generated color image to the display.

According to a sixth aspect of the present invention, in any one of the first to fifth aspects, the imaging apparatus may further include a light emitting device configured to generate illumination light having a first peak of an amount of light in the first wavelength band and having a second peak of an amount of light in the second wavelength band.

According to a seventh aspect of the present invention, in the sixth aspect, the first wavelength band may include longer wavelengths than any wavelength included in the second wavelength band. An amount of the illumination light at the shortest wavelength of the first wavelength band is less than the amount of the illumination light at the first peak. An amount of the illumination light at the longest wavelength of the second wavelength band is less than the amount of the illumination light at the second peak.

According to an eighth aspect of the present invention, in the sixth or seventh aspect, the processor may be configured to correct at least one of the second signal and the third signal on the basis of an amount of components of illumination light, the second transmittance characteristics, and the third transmittance characteristics.

According to a ninth aspect of the present invention, in the eighth aspect, the processor may be configured to calculate a second coefficient on the basis of the amount of the components of the illumination light, the second transmittance characteristics, and the third transmittance characteristics. The processor may be configured to multiply the third signal by the calculated second coefficient. The processor may be configured to subtract the third signal multiplied by the second coefficient from the second signal.

According to a tenth aspect of the present invention, in the eighth aspect, the processor may be configured to calculate a third coefficient on the basis of the amount of the components of the illumination light, the second transmittance characteristics, and the third transmittance characteristics. The processor may be configured to multiply the second signal by the calculated third coefficient. The processor may be configured to subtract the second signal multiplied by the third coefficient from the third signal.

According to an eleventh aspect of the present invention, in any one of the sixth to tenth aspects, the processor may be configured to switch between a first state in which the light emitting device generates the illumination light used for measurement and a second state in which the light emitting device generates the illumination light used for observation. The processor may be configured to calculate at least one of a phase difference between the first signal and the third signal and a phase difference between the second signal and the third signal when the light emitting device is in the first state.

BRIEF DESCRIPTION OF THE DRAWINGS

FIG. 10 is a diagram showing a pixel arrangement of an R image in the first embodiment of the present invention.

FIG. 11 is a diagram showing a pixel arrangement of a G image in the first embodiment of the present invention.

DETAILED DESCRIPTION OF THE INVENTION

When an imaging apparatus disclosed in Japanese Unexamined Patent Application, First Publication No. 2013-044806 captures an image of a subject at a position away from the focusing position, color shift in an image occurs. The imaging apparatus including a pupil division optical system disclosed in Japanese Unexamined Patent Application, First Publication No. 2013-044806 approximates a shape and a centroid position of blur in an R image and a B image to a shape and a centroid position of blur in a G image so as to display an image in which double images due to color shift are suppressed.

In the imaging apparatus disclosed in Japanese Unexamined Patent Application, First Publication No. 2013-044806, correction of an R image and a B image is performed on the basis of a shape of blur in a G image. For this reason, the premise is that a waveform of a G image has no distortion (no double images). However, there are cases in which a waveform of a G image has distortion. Hereinafter, distortion of a waveform of a G image will be described with reference to FIGS. 21 to 23.

Figure 21:
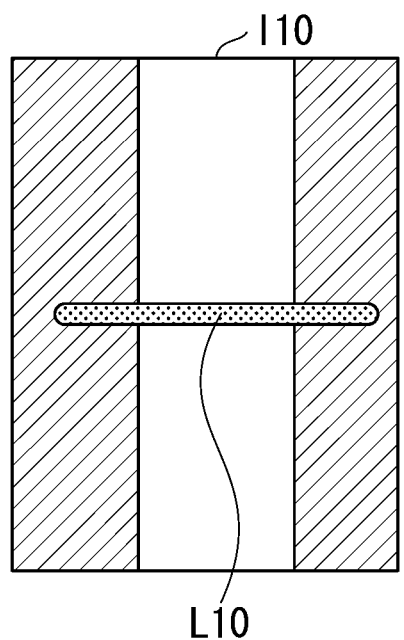
FIG. 21 is a diagram showing a captured image of a subject in white and black.
Figure 22:
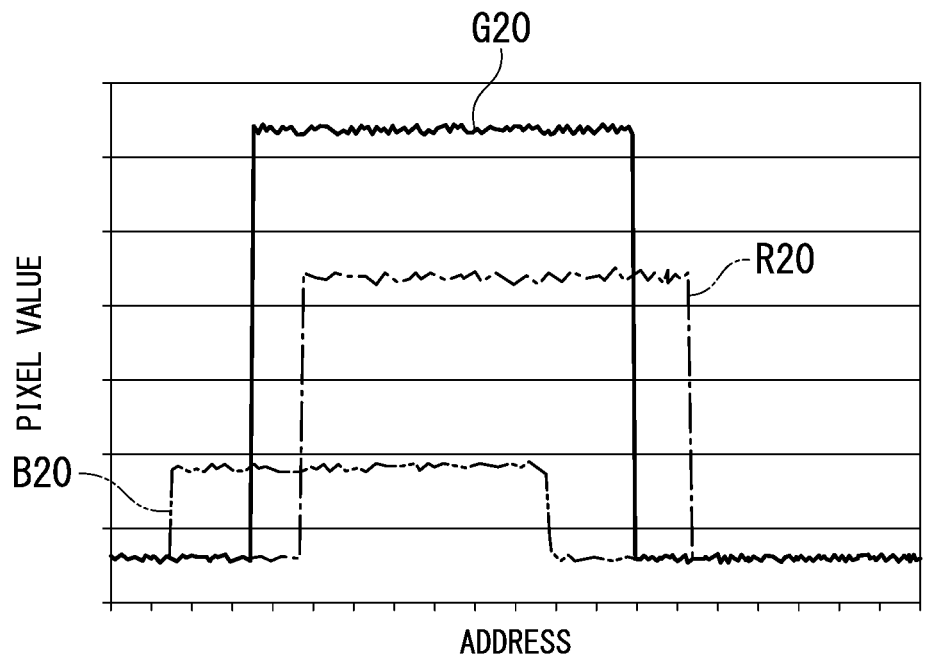
FIG. 22 is a diagram showing a line profile of a captured image of a subject in white and black.
Figure 23:
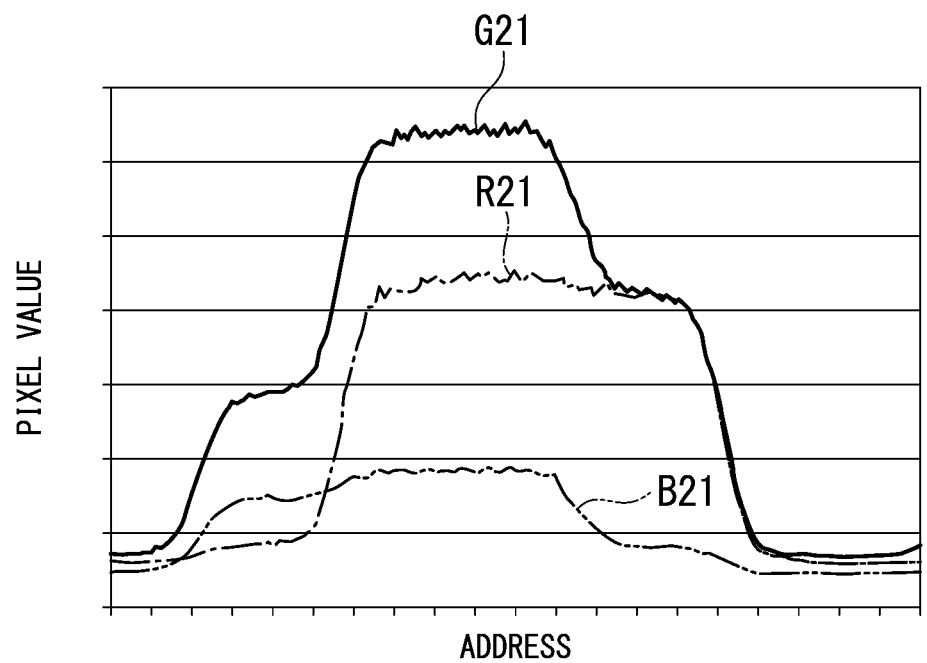
FIG. 23 is a diagram showing a line profile of a captured image of a subject in white and black.

FIG. 21 shows a captured image I10 of a subject in black and white. FIGS. 22 and 23 show a profile of a line L10 in the captured image I10. The horizontal axis in FIGS. 22 and 23 represents an address of the captured image in the horizontal direction and the vertical axis represents a pixel value of the captured image. FIG. 22 shows a profile in a case where transmittance characteristics of color filters of respective colors do not overlap. FIG. 23 shows a profile in a case where transmittance characteristics of color filters of respective colors overlap. A profile R20 and a profile R21 are a profile of an R image. The R image includes information of pixels in which R color filters are disposed. A profile G20 and a profile G21 are a profile of a G image. The G image includes information of pixels in which G color filters are disposed. A profile B20 and a profile B21 are a profile of a B image. The B image includes information of pixels in which B color filters are disposed.

FIG. 22 shows that a waveform of the profile G20 of the G image has no distortion, but FIG. 23 shows that a waveform of the profile G21 of the G image has distortion. Light transmitted through a G color filter includes components of R and B. Due to the components, color shift occurs in an image. In addition, there is a phase difference between G light transmitted through a first pupil area and G light transmitted through a second pupil area. Due to the color shift and the phase difference, distortion occurs in the waveform of the profile G21 of the G image. In the imaging apparatus disclosed in Japanese Unexamined Patent Application, First Publication No. 2013-044806, the profile G20 shown in FIG. 22 is the premise and the distortion of the waveform that occurs in the profile G21 shown in FIG. 23 is not the premise. For this reason, in a case where a shape and a centroid position of blur in the R image and the B image are corrected on the bases of the G image represented by the profile G21 shown in FIG. 23, there is a problem that the imaging apparatus displays an image including double images. In addition, there is a phase difference between R light transmitted through a first pupil area and B light transmitted through a second pupil area, Due to the phase difference, the imaging apparatus displays an image including double images.

Hereinafter, embodiments of the present invention will be described with reference to the drawings.

First Embodiment

Figure 1:
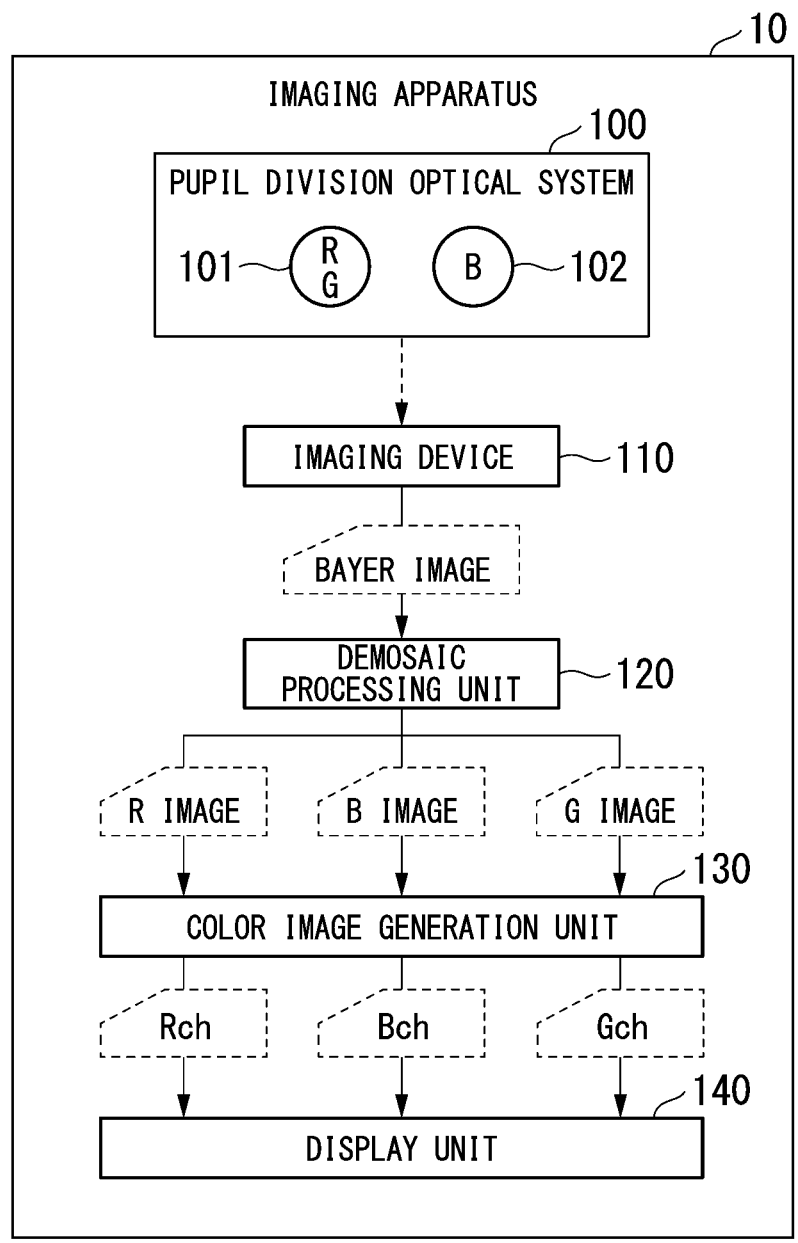
FIG. 1 is a block diagram showing a configuration of an imaging apparatus according to a first embodiment of the present invention.

FIG. 1 shows a configuration of an imaging apparatus 10 according to a first embodiment of the present invention. The imaging apparatus 10 is a digital still camera, a video camera, a mobile phone with a camera, a mobile information terminal with a camera, a personal computer with a camera, a surveillance camera, an endoscope, a digital microscope, or the like. As shown in FIG. 1 the imaging apparatus 10 includes a pupil division optical system 100, an imaging device 110, a demosaic processing unit 120, a color image generation unit 130, and a display unit 140.

A schematic configuration of the imaging apparatus 10 will be described. The pupil division optical system 100 includes a first pupil 101 transmitting light of a first wavelength band and a second pupil 102 transmitting light of a second wavelength band different from the first wavelength band. The amount of components of a transmission wavelength band of first transmittance characteristics overlapping the first wavelength band is more than the amount of components of a transmission wavelength band of the first transmittance characteristics overlapping the second wavelength band. The amount of components of a transmission wavelength band of second transmittance characteristics overlapping the first wavelength band is more than the amount of components of a transmission wavelength band of the second transmittance characteristics overlapping the second wavelength band. The amount of components of a transmission wavelength band of third transmittance characteristics overlapping the second wavelength band is more than the amount of components of a transmission wavelength band of the third transmittance characteristics overlapping the first wavelength band. The first transmittance characteristics, the second transmittance characteristics, and the third transmittance characteristics are different from each other.

The imaging device 110 generates a first signal by capturing an image of light transmitted through the pupil division optical system 100 and a first color filter having the first transmittance characteristics. The imaging device 110 generates a second signal by capturing an image of light transmitted through the pupil division optical system 100 and a second color filter having the second transmittance characteristics. The imaging device 110 generates a third signal by capturing an image of light transmitted through the pupil division optical system 100 and a third color filter having the third transmittance characteristics. The color image generation unit 130 generates a color image including the first signal as a first channel and the second signal as a second channel and a third channel. The color image generation unit 130 outputs the generated color image to the display unit 140.

A detailed configuration of the information imaging apparatus 10 will be described. The first pupil 101 of the pupil division optical system 100 includes an RG filter transmitting light of wavelengths of R (red) and G (green). The second pupil 102 of the pupil division optical system 100 includes a B filter transmitting light of wavelengths of B (blue).

Figure 2:
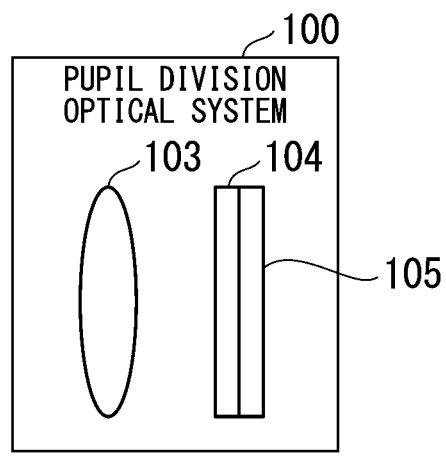
FIG. 2 is a block diagram showing a configuration of a pupil division optical system according to the first embodiment of the present invention.

FIG. 2 shows a configuration of the pupil division optical system 100. As shown in FIG. 2, the pupil division optical system 100 includes a lens 103, a band limiting filter 104, and a diaphragm 105. For example, the lens 103 is typically constituted by a plurality of lenses in many cases. Only one lens is shown in FIG. 2 for brevity. The band limiting filter 104 is disposed on an optical path of light incident on the imaging device 110. For example, the band limiting filter 104 is disposed at the position of the diaphragm 105 or in the vicinity of the position. In the example shown in FIG. 2, the band limiting filter 104 is disposed between the lens 103 and the diaphragm 105. The diaphragm 105 adjusts brightness of light incident on the imaging device 110 by limiting the passing range of light that has passed through the lens 103.

Figure 3:
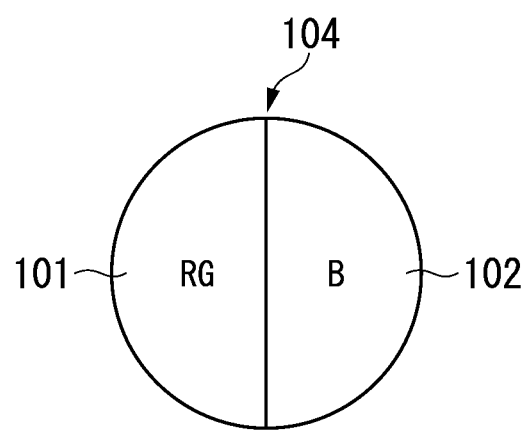
FIG. 3 is a block diagram showing a configuration of a band limiting filter according to the first embodiment of the present invention.

FIG. 3 shows a first example of a configuration of the band limiting filter 104. In the example shown in FIG. 3, when the band limiting filter 104 is seen from the imaging device 110 side, the left half of the band limiting filter 104 constitutes the first pupil 101 and the right half of the band limiting filter 104 constitutes the second pupil 102. In other words, the left half of the band limiting filter 104 constitutes the RG filter of the first pupil 101 and the right half of the band limiting filter 104 constitutes the B filter of the second pupil 102, The first pupil 101 transmits light of wavelengths of R and G and blocks light of wavelengths of B. In other words, the first pupil 101 transmits red light and green light and blocks blue light. The second pupil 102 transmits light of wavelengths of B and blocks light of wavelengths of R and G. In other words, the second pupil 102 transmits blue light and blocks red light and green light.

Figure 4:
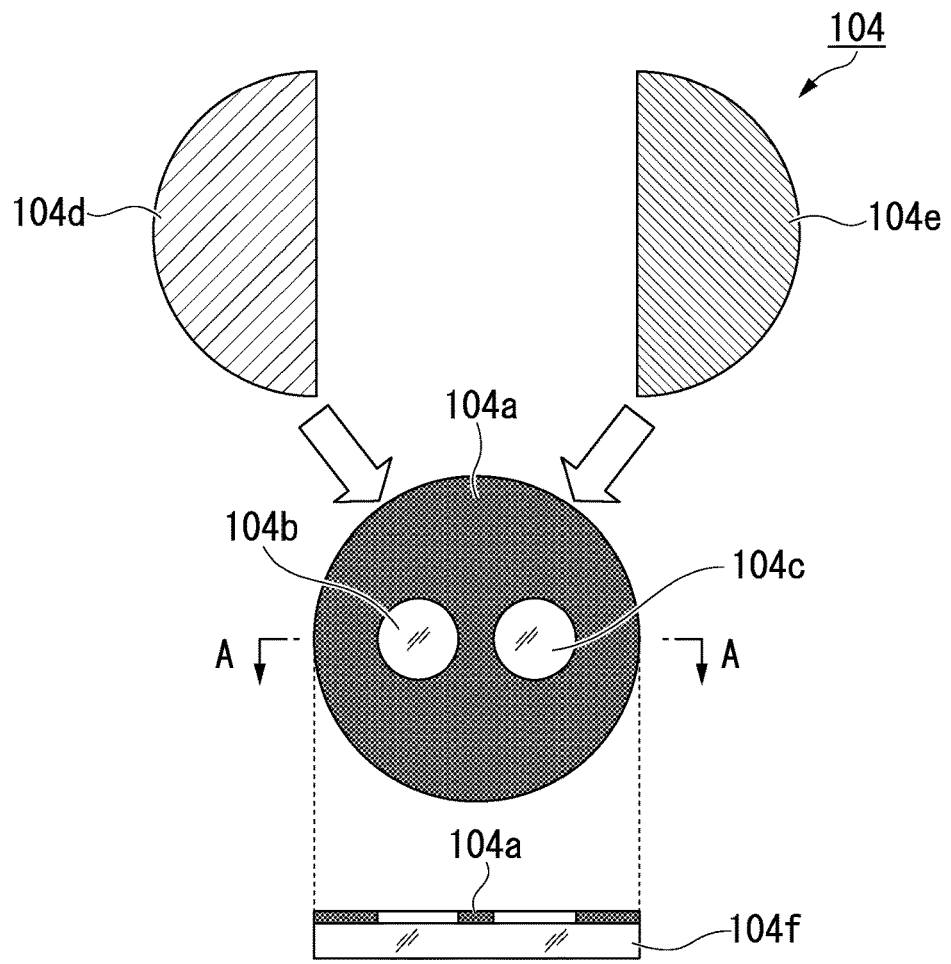
FIG. 4 is a block diagram showing a configuration of a band limiting filter according to the first embodiment of the present invention.
Figure 5:
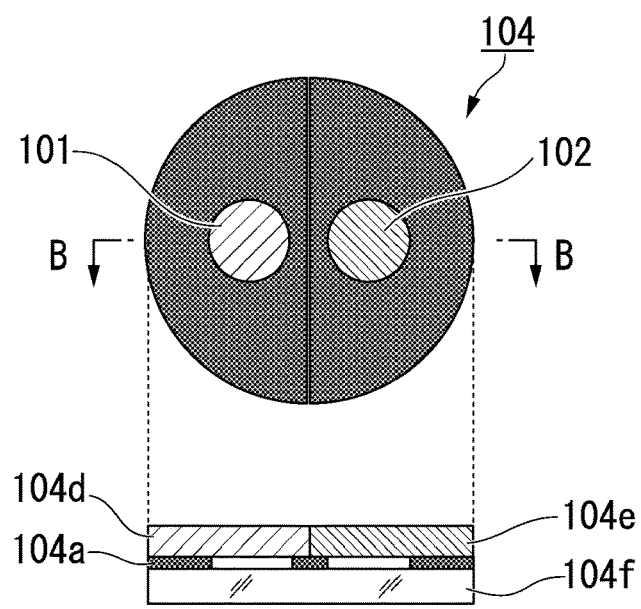
FIG. 5 is a block diagram showing a configuration of a band limiting filter according to the first embodiment of the present invention.

FIGS. 4 and 5 show a second example of a configuration of the hand limiting filter 104. As shown in FIG. 4, a thin film 104a is formed on the surface of a transparent flat plate 104f and a first opening portion 104b and a second opening portion 104c are formed in the thin film 104a. For example, the flat plate 104f has a circular shape. The thin film 104a is a black metal such as black chromium. The thin film 104a is formed by vapor deposition or the like. The radiuses of the first opening portion 104b and the second opening portion 104c are the same. However, the radiuses of the first opening portion 104b and the second opening portion 104c may be different from each other. On the lower side in FIG. 4, a cross-section A-A is shown that passes through the centers of the flat plate 104f, the first opening portion 104b, and the second opening portion 104c for the flat plate 104f having the thin film 104a formed on the surface thereof.

A first color filter 104d having a half-circle shape and a second color filter 104e having a half-circle shape are attached to the surface of the thin film 104a. The first color filter 104d covers the first opening portion 104h and the second color filter 104e covers the second opening portion 104c. Reflected light of illumination light emitted to a subject is incident to the first color filter 104d and the second color filter 104e. The first color filter 104d transmits red light and green light and blocks blue light. The second color filter 104e transmits blue light and blocks red light and green light. As shown in FIG. 5, the first color filter 104d disposed in the first opening portion 104b constitutes the first pupil 101 and the second color filter 104e disposed in the second opening portion 104c constitutes the second pupil 102. In other words, the first color filter 104d constitutes the RG filter of the first pupil 101 and the second color filter 104e constitutes the B filter of the second pupil 102. On the lower side in FIG. 5, a cross-section B-B is shown that passes through the centers of the flat plate 1041, the first opening portion 104b, and the second opening portion 104c for the flat plate 104f having the thin film 104a formed on the surface, the first color filter 104d, and the second color filter 104e.

The configuration of the band limiting filter 104 is not limited to the configurations shown in FIGS. 3 to 5. As long as the imaging device 110 is able to capture an image of a plurality of light beams having a phase difference therebetween, the band limiting ter 104 may be configured in any way.

The imaging device 110 is a photoelectric conversion element such as a charge coupled device (CCD) sensor and a complementary metal oxide semiconductor (CMOS) sensor of the XY-address-scanning type. As a configuration of the imaging device 110, there is a type such as a single-plate-primary-color Bayer array and a three-plate type using three sensors. Hereinafter, an embodiment of the present invention will be described with reference to examples in which a CMOS sensor (500×500 pixels and depth of 10 bits) of the single-plate-primary-color Bayer array is used.

Figure 6:
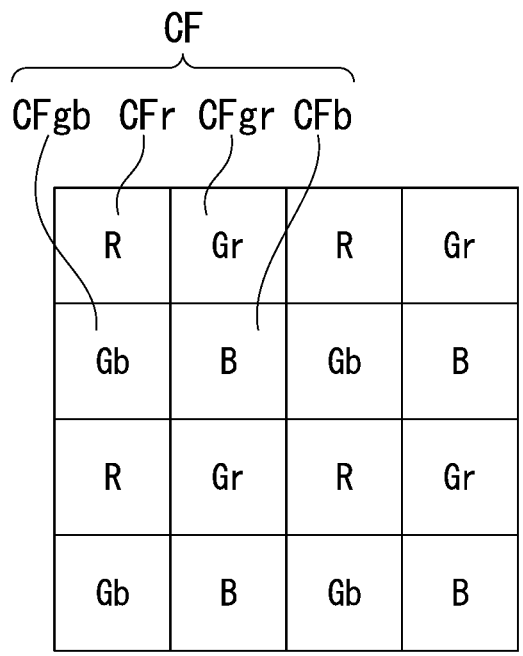
FIG. 6 is a diagram showing arrangement of color filters according to the first embodiment of the present invention.

The imaging device 110 includes a plurality of pixels. As shown in FIG. 6, the imaging device 110 includes a color filter CF disposed in each pixel. FIG. 6 shows arrangement of the color filter CF. The color filter CF includes an R filter CFr (first color filter), a G filter CFgr (second color filter), a G filter CFgb (second color filter), and a B filter CFb (third color filter).

The R filter CFr has the first transmittance characteristics. The R filter CFr transmits red light and blocks light other than the red light. The G filter CFgr and the G filter CFgb have the second transmittance characteristics. The G filter CFgr and the G filter CFgb transmit green light and block light other than the green light. The B filter CFb has the third transmittance characteristics. The B filter CFb transmits blue light and blocks light other than the blue light.

The arrangement of the color filter CF shown in FIG. 6 is a Bayer array. In the Bayer array, a basic array is disposed regularly and periodically in a row direction and a column direction. The basic array includes one R filter CFr, two G filters CFgr and CFgb, and one B filter CFb.

Figure 7:
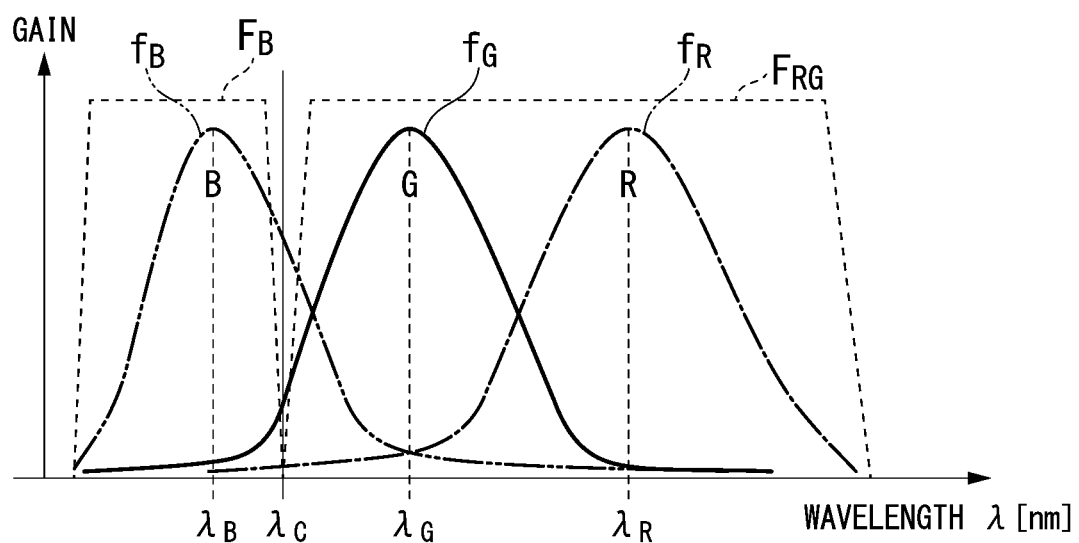
FIG. 7 is a diagram showing an example of spectral characteristics of an RG filter of a first pupil, a B filter of a second pupil, and color filters of an imaging device in the first embodiment of the present invention.

Light transmitted through the pupil division optical system 100 and the color filter CF is incident on each pixel of the imaging device 110. Light transmitted through the pupil division optical system 100 contains light transmitted through the first pupil 101 and light transmitted through the second pupil 102. The imaging device 110 generates an R signal (first signal) that is based on red light, a G signal (second signal) that is based on green light, and a B signal (third signal) that is based on blue light. The imaging device 110 acquires and outputs a captured image including the R signal, the G signal, and the B signal, FIG. 7 shows an example of spectral characteristics (transmittance characteristics) of the RG filter of the first pupil 101, the B filter of the second pupil 102, and the color filter CF of the imaging device 110. The horizontal axis in FIG. 7 represents a wavelength λ [nm] and the vertical axis in FIG. 7 represents gain. A line $F_{RG}$, represents spectral characteristics of the RG filter of the first pupil 101. A line $F_B$ represents spectral characteristics of the B filter of the second pupil 102. A wavelength $\lambda_C$ is the boundary between the spectral characteristics of the RG filter of the first pupil 101 and the spectral characteristics of the B filter of the second pupil 102. A transmission wavelength band in spectral characteristics consists of wavelengths in which the transmittance, that is, gain is greater than a predetermined value (for example, 0).

The RG filter of the first pupil 101 transmits light of a wavelength band (first wavelength band) of longer wavelengths than the wavelength $\lambda_C$. The B filter of the second pupil 102 transmits light of a wavelength band (second wavelength band) of shorter wavelengths than the wavelength $\lambda_C$. A line $f_R$ represents spectral characteristics (first transmittance characteristics) of the R filter CFr of the imaging device 110. A line $f_G$ represents spectral characteristics (second transmittance characteristics) of the G filters CFgr and CFgb of the imaging device 110. The filtering characteristics of the G filter CFgr and the G filter CFgb are almost the same. A line $f_B$ represents spectral characteristics (third transmittance characteristics) of the B filter CFb of the imaging device 110. Spectral characteristics of the filters of the imaging device 110 overlap each other.

Components of a transmission wavelength band (line $f_R$) of the R filter CFr overlapping a transmission wavelength band (first wavelength band) of the RG filter of the first pupil 101 represented by the line $F_{RG}$ are greater than components of a transmission wavelength band (line $f_R$) of the R filter CFr overlapping a transmission wavelength band (second wavelength band) of the B filter of the second pupil 102 represented by the line $F_B$. A value acquired by integrating a function of transmittance represented by the line $f_R$ with respect to a wavelength in the transmission wavelength band of the RG filter of the first pupil 101 is greater than a value acquired by integrating a function of transmittance represented by the line $f_R$ with respect to a wavelength in the transmission wavelength band of the B filter of the second pupil 102.

Components of a transmission wavelength band (line $f_G$) of the G filters CFgr and CFgb overlapping a transmission wavelength band (first wavelength band) of the RG filter of the first pupil 101 represented by the line $F_{RG}$ are greater than components of a transmission wavelength band (line $f_G$) of the G filters CFgr and CFgb overlapping a transmission wavelength band (second wavelength band) of the B filter of the second pupil 102 represented by the line $F_B$. A value acquired by integrating a function of transmittance represented by the line $f_G$ with respect to a wavelength in the transmission wavelength band of the RG filter of the first pupil 101 is greater than a value acquired by integrating a function of transmittance represented by the line $f_G$ with respect to a wavelength in the transmission wavelength band of the B filter of the second pupil 102.

Components of a transmission wavelength band (line $f_B$) of the B filter CFb overlapping a transmission wavelength band (second wavelength band) of the B filter of the second pupil 102 represented by the line $F_B$ are greater than components of a transmission wavelength band (line $f_B$) of the B filter CFb overlapping a transmission wavelength band (first wavelength band) of the RG filter of the first pupil 101 represented by the line $F_{RG}$. A value acquired by integrating a function of transmittance represented by the line $f_B$ with respect to a wavelength in the transmission wavelength band of the B filter of the second pupil 102 is greater than a value acquired by integrating a function of transmittance represented by the fine $f_B$ with respect to a wavelength in the transmission wavelength band of the RG filter of the first pupil 101.

A first wavelength $\lambda_R$ at which the transmittance, that is, gain is the greatest n the spectral characteristics of the R filter CFr represented by the line $f_R$ is included in the transmission wavelength band of the RG filter of the first pupil 101 represented by the line $F_{RG}$. A second wavelength $\lambda_G$ at which the transmittance, that is, gain is the greatest in the spectral characteristics of the G filters CFgr and CFO represented by the line $f_G$ is included in the transmission wavelength band of the RG filter of the first pupil 101 represented by the line $F_{RG}$. A third wavelength $\lambda_B$ at which the transmittance, that is, gain is the greatest in the spectral characteristics of the B filter CFb represented by the line $f_B$ is included in the transmission wavelength band of the B filter of the second pupil 102 represented by the line $F_B$.

The transmission wavelength band (line $f_R$) of the R filter CFr and the transmission wavelength band (line $f_G$) of the G filters CFgr and CFgb include longer wavelengths than any wavelength included in the transmission wavelength band (line $f_B$) of the B filter CRb. The transmission wavelength band (line $f_R$) of the R filter CFr includes longer wavelengths than any wavelength included in the transmission wavelength band (line $f_G$) of the G filters CFgr and CFgb. The third wavelength $\lambda_B$ is a wavelength other than wavelengths from the first wavelength $\lambda_R$ to the second wavelength $\lambda_G$. The first wavelength $\lambda_R$ and the second wavelength $\lambda_G$ are longer than the third wavelength $\lambda_B$. The first wavelength $\lambda_R$ is longer than the second wavelength $\lambda_G$.

Two light beams transmitted through the two pupils included in the pupil division optical system 100 are not limited to the above-described examples. For example, the first pupil 101 may include an R filter transmitting light of the R wavelength and the second pupil 102 may include a GB filter transmitting light of the G and B wavelengths.

Figures 8, 9:
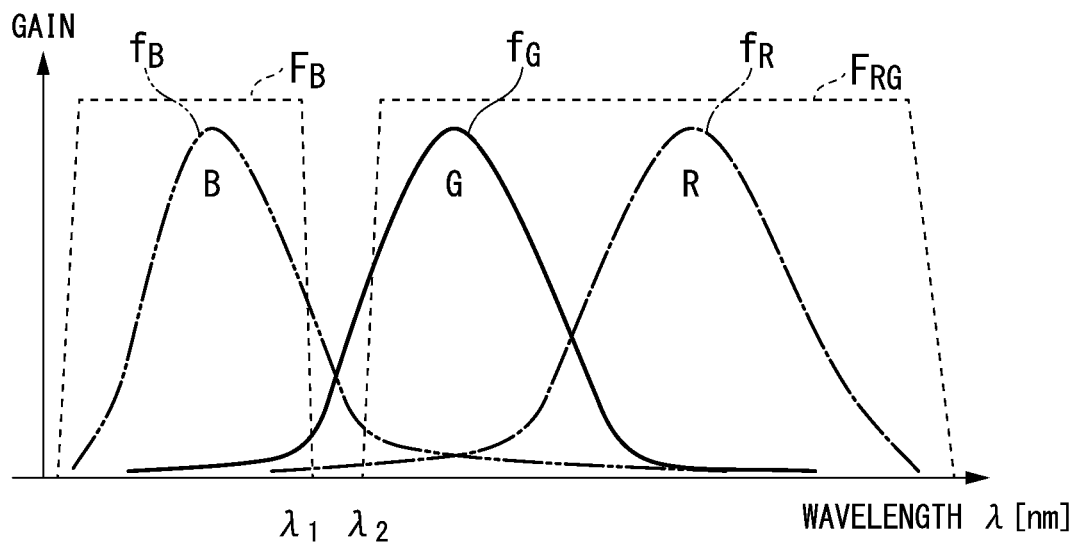
FIG. 8 is a diagram showing an example of spectral characteristics of the RG filter of the first pupil, the B filter of the second pupil, and the color filters of the imaging device in the first embodiment of the present invention.
FIG. 9 is a diagram showing a pixel arrangement of a Bayer image in the first embodiment of the present invention.

The band of shorter wavelengths in the transmission wavelength band of the RG filter of the first pupil 101 represented by the line $F_{RG}$ and the band of longer wavelengths in the transmission wavelength band of the B filter of the second pupil 102 represented by the line $F_B$ may not be consecutive. As shown in FIG. 8, the RG filter of the first pupil 101 may transmit light of a wavelength band (first wavelength band) of longer wavelengths than a wavelength $\lambda_2$ and the B filter of the second pupil 102 may transmit light of a wavelength band (second wavelength band) of shorter wavelengths than a wavelength $\lambda_1$. The wavelength $\lambda_2$ is longer than the wavelength $\lambda_1$. The transmission wavelength band (first wavelength band) of the RG filter of the first pupil 101 and the transmission wavelength band (second wavelength band) of the B filter of the second pupil 102 do not overlap each other.

Analog front end (AFE) processing such as correlated double sampling (CDS), analog gain control (AGC), and analog-to-digital converter (ADC) is performed by the imaging device 110 on an analog captured image signal generated through photoelectric conversion in the CMOS sensor. A circuit outside the imaging device 110 may perform AFE processing. A captured image (Bayer image) acquired by the imaging device 110 is transferred to the demosaic processing unit 120.

In the demosaic processing unit 120, a Bayer image is converted to an RGB image and a color image is generated. HG 9 shows a pixel arrangement of a Bayer image. R (red) and Gr (green) pixels are alternately disposed in odd rows and Gb (green) and B (blue) pixels are alternately disposed in even rows. R (red) and Gb (green) pixels are alternately disposed in odd columns and Gr (green) and B (blue) pixels are alternately disposed in even columns.

The demosaic processing unit 120 performs black-level correction (optical-black (OB) subtraction) on pixel values of a Bayer image. In addition, the demosaic processing unit 120 generates pixel values of adjacent pixels by copying pixel values of pixels. In this way, an RGB image having pixel values of each color in all the pixels is generated. For example, after the demosaic processing unit 120 performs OB subtraction on an R pixel value (R_00), the demosaic processing unit 120 copies a pixel value (R_00−OB). In this way, R pixel values in Gr, Gb, and B pixels adjacent to an R pixel are interpolated. FIG. 10 shows a pixel arrangement of an R image.

Similarly, after the demosaic processing unit 120 performs OB subtraction on a Gr pixel value (Gr_01), the demosaic processing unit 120 copies a pixel value (Gr_01−OB). In addition, after the demosaic processing unit 120 performs OB subtraction on a Gb pixel value (Gb_10), the demosaic processing unit 120 copies a pixel value (Gb_10−OB). In this way, G pixel values in an R pixel adjacent to a Gr pixel and in a 13 pixel adjacent to a Gb pixel are interpolated. FIG. 11 shows a pixel arrangement of a G image.

Figures 12, 13:
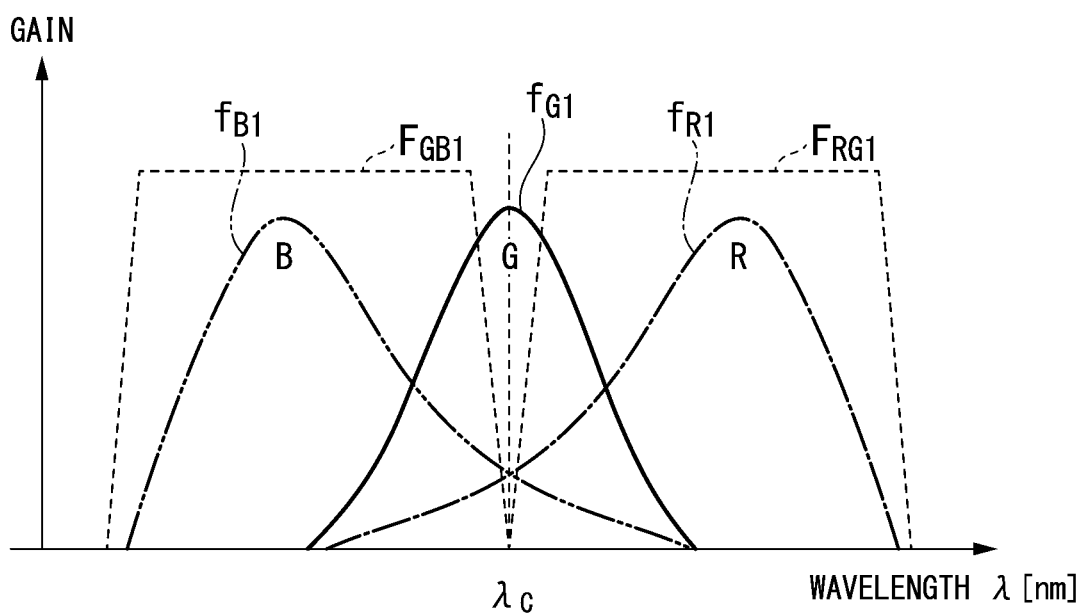
FIG. 12 is a diagram showing a pixel arrangement of a B image in the first embodiment of the present invention.
FIG. 13 is a diagram showing an example of spectral characteristics of an RG filter of a first pupil, a GB filter of a second pupil, and color filters of an imaging device of the related art.

Similarly, after the demosaic processing unit 120 performs OB subtraction on a B pixel value (B_11), the demosaic processing unit 120 copies a pixel value (B_11−OB). In this way, B pixel values in R, Gr, and Gb pixels adjacent to a B pixel are interpolated. FIG. 12 shows a pixel arrangement of a B image.

The demosaic processing unit 120 generates a color image (RGB image) including an R image, a G image, and a B image through the above-described processing. A specific method of demosaic processing is not limited to the above-described method. Filtering processing may be performed on a generated RGB image. An RGB image generated by the demosaic processing unit 120 is transferred to the color image generation unit 130. In a case where the imaging device 110 of a three-plate type is used, demosaic processing may not be performed.

The color image generation unit 130 generates a color image including an R channel (first channel), a G channel (second channel), and a B channel (third channel) on the basis of the RGB image generated by the demosaic processing unit 120. The color image generation unit 130 deals with the R image, that is, R signal as a signal for the R channel, deals with the G image, that is, G signal as a signal for the G channel, and deals with the G image, that is, G signal as a signal for the B channel. The color image generation unit 130 may generate a color image including the G image as the G channel and the R image as the R channel and the B channel.

The demosaic processing unit 120 and the color image generation unit 130 may be constituted by an application specific integrated circuit (ASIC), a field-programmable gate array (FPGA), a microprocessor, and the like. For example, the demosaic processing unit 120 and the color image generation unit 130 may be constituted by an ASIC and an embedded processor. The demosaic processing unit 120 and the color image generation unit 130 may be constituted by hardware, software, firmware, or combinations thereof other than the above.

The display unit 140 is a transparent type liquid crystal display (LCD) requiring backlight, a self-light-emitting type electro luminescence (EL) element (organic EL), and the like. For example, the display unit 140 is constituted as a transparent type LCD and includes a driving unit necessary for LCD driving. The driving unit generates a driving signal and drives an LCD by using the driving signal. The display unit 140 displays the color image generated by the color image generation unit 130.

Hereinafter, differences of effects between the related art and the first embodiment of the present invention will be described. A first pupil of a pupil division optical system of the related art includes an RG filter transmitting red light and green light. A second pupil of a pupil division optical system of the related art includes a GB filter transmitting blue light and green light.

FIG. 13 shows an example of spectral characteristics (transmittance characteristics) of the RG filter of the first pupil, the GB filter of the second pupil, and a color filter of an imaging device in the related art. The horizontal axis in FIG. 13 represents a wavelength $\lambda$ [nm] and the vertical axis in FIG. 13 represents gain. A line $F_{RG1}$ represents spectral characteristics of the RG filter. A line $F_{GB1}$ represents spectral characteristics of the GB filter. A wavelength $\lambda_C$ is the boundary between the spectral characteristics of the RG filter and the spectral characteristics of the GB filter.

The RG filter transmits light of a wavelength band of longer wavelengths than the wavelength $\lambda_C$. The GB filter transmits light of a wavelength band of shorter wavelengths than the wavelength $\lambda_C$. A line $f_{R1}$ represents spectral characteristics of an R filter of the imaging device. A line $f_{G1}$ represents spectral characteristics of a G filter of the imaging device. A line $f_{B1}$ represents spectral characteristics of a B filter of the imaging device.

A wavelength at which the transmittance, that is, gain is the greatest in the spectral characteristics of the G filter represented by the line $f_{G1}$ coincides with the wavelength $\lambda_C$. A transmission wavelength band of the G filter is included in a transmission wavelength band of the RG filter represented by the line $F_{RG1}$ and a transmission wavelength band of the GB filter represented by the line $F_{GB1}$. For this reason, green light transmitted through the RG filter and the G filter and green light transmitted through the GB filter and the G filter are incident on pixels of the imaging device. Two types of green light have a phase difference therebetween. For this reason, double images occur in a G image that is based on the two types of green light and visibility of an RGB image deteriorates.

In addition, an R image that is based on red light transmitted through the RG filter and the R filter and a B image that is based on blue light transmitted through the GB filter and the B filter have a phase difference therebetween. For this reason, double images occur in the RGB image and visibility of the RGB image deteriorates.

In the first embodiment of the present invention, most of green light incident on pixels in which the G filters CFgr and CFgb are disposed includes green light transmitted through the RG filter of the first pupil 101 and the G filters CFgr and CFgb. The phase of the green light incident on the pixels in which the G filters CFgr and CFgb are disposed is almost uniform. For this reason, double images are suppressed and visibility of an image is improved.

A phase difference occurs between red light transmitted through the first pupil 101 and blue light transmitted through the second pupil 102. In addition, a phase difference occurs between green light transmitted through the first pupil 101 and blue light transmitted through the second pupil 102. There are cases in which a phase of a B image is different from a phase of an R image and a phase of a G image in an RGB image generated on the basis of an R signal, a G signal, and a B signal.

In the color image generated by the color image generation unit 130, the R image is included in the R channel and the G image is included in the G channel and the B channel. Since the color image not including the B image having a phase difference for the R image and the G image is generated, phase differences between the channels are reduced. In this way, double images are suppressed and visibility of an image is improved. The color image generation unit 130 uses the G image that is based on light transmitted through the G filters CFgr and CFgb of which the transmission wavelength band is closer to that of the B filter CFb among the R filter CFr and the G filters CFgr and CFgb for the B channel. In this way, color reproducibility of a subject is enhanced.

The imaging apparatus 10 may be an endoscope apparatus. In an industrial endoscope, the pupil division optical system 100 and the imaging device 110 are disposed at the distal end of an insertion unit that is to be inserted into the inside of an object for observation and measurement.

The imaging apparatus 10 according to the first embodiment includes the color image generation unit 130 and thus can suppress double images and improve visibility of an image. Even when a user observes an image in a method in which a phase difference is acquired on the basis of two images, the user can observe an image in which double images are suppressed and visibility is improved.

Second Embodiment

Figure 14:
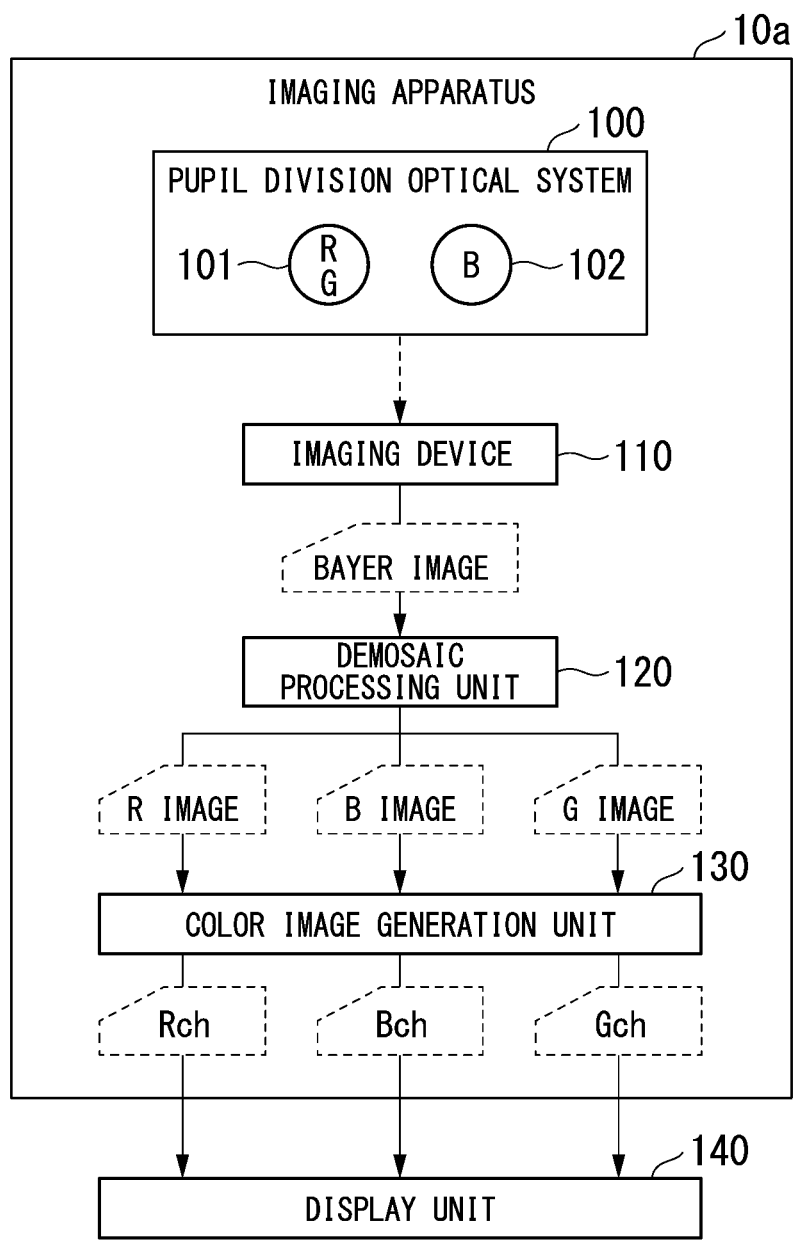
FIG. 14 is a block diagram showing a configuration of an imaging apparatus according to a second embodiment of the present invention.

FIG. 14 shows a configuration of an imaging apparatus 10a according to a second embodiment of the present invention. In terms of the configuration shown in FIG. 14, differences from the configuration shown in FIG. 1 will be described.

The imaging apparatus 10a does not include the display unit 140. The display unit 140 is constituted independently of the imaging apparatus 10a. A color image output from the color image generation unit 130 may be output to the display unit 140 via a communicator. For example, the communicator performs wired or wireless communication with the display unit 140.

In terms of points other than the above, the configuration shown in FIG. 14 is similar to the configuration shown in FIG. 1.

The imaging apparatus 10a may be an endoscope apparatus.

The imaging apparatus 10a according to the second embodiment can suppress double images and improve visibility of an image as with the imaging apparatus 10 according to the first embodiment. Since the display unit 140 is independent of the imaging apparatus 10a, the imaging apparatus 10a can be miniaturized.

Third Embodiment

Figure 15:
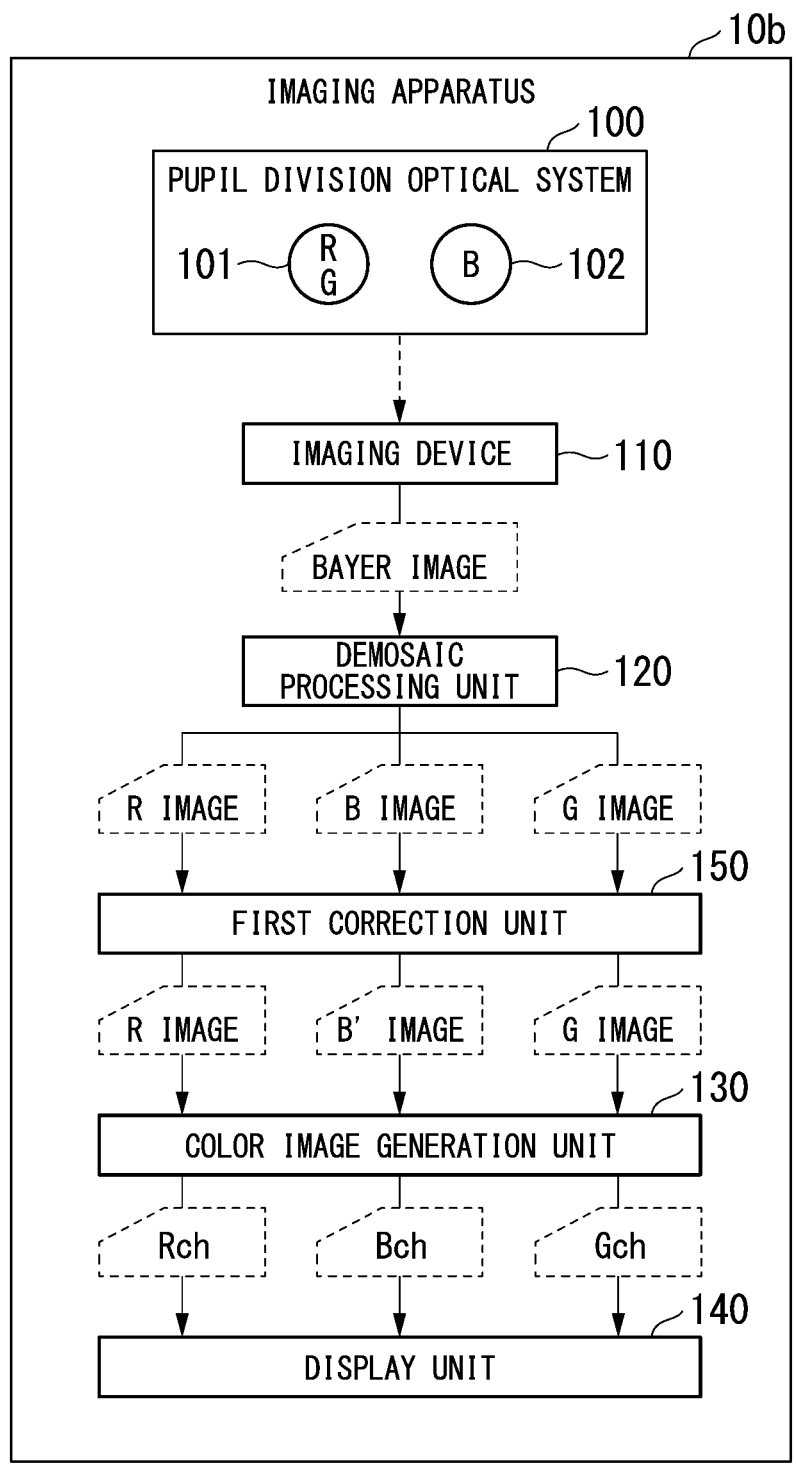
FIG. 15 is a block diagram showing a configuration of an imaging apparatus according to a third embodiment of the present invention.

FIG. 15 shows a configuration of an imaging apparatus 10b according to a third embodiment of the present invention. In terms of the configuration shown in FIG. 15, differences from the configuration shown in FIG. 1 will be described.

The imaging apparatus 10b includes a first correction unit 150 in addition to the configurations shown in FIG. 1. In the first embodiment, there are cases in which color reproducibility deteriorates for certain spectral ratio of a subject. For example, color reproducibility of a subject including a great deal of blue components is likely to deteriorate. The first correction unit 150 executes processing for improving color reproducibility of a subject. The first correction unit 150 calculates a first coefficient on the basis of a G image (second signal) and a B image (third signal) and generates a B' image (fourth signal) by correcting, on the basis of the calculated first coefficient, the G image used for a B channel (third channel).

Specifically, the first correction unit 150 corrects the G image output from the demosaic processing unit 120 on the basis of the G image and the B image output from the demosaic processing unit 120. In this way, the first correction unit 150 generates a B' image. The first correction unit 150 outputs the generated B' image to the color image generation unit 130. In addition, the first correction unit 150 outputs the R image and the G image output from the demosaic processing unit 120 to the color image generation unit 130. The R image and the G image output from the demosaic processing unit 120 may be input to the color image generation unit 130 without passing through the first correction unit 150. The first correction unit 150 may be constituted by an ASIC, an FPGA, a microprocessor, and the like as with the demosaic processing unit 120 or the like.

The color image generation unit 130 generates a color image including the R image as the R channel, the G image as the second channel, and the B' image as the third channel.

In terms of points other than the above, the configuration shown in FIG. 15 is similar to the configuration shown in FIG. 1.

Details of processing executed by the first correction unit 150 will be described. For example, the first correction unit 150 calculates a first coefficient $\alpha$ on the basis of an average pixel value of the G image and an average pixel value of the B image by using following expression (1).

$$\alpha = Ab/Ag \quad (1)$$

Ab in expression (1) represents the average pixel value of the B image and Ag in expression (1) represents the average pixel value of the G image. The first correction unit 150 calculates a pixel value of the B' image by multiplying a pixel value of the G image by the first coefficient $\alpha$ as shown in following expression (2).

$$Bb' = Gg \times \alpha \quad (2)$$

Bb' in expression (2) represents the pixel value of the B' image and Gg in expression (2) represents the pixel value of the G image.

The first coefficient $\alpha$ is not limited to a value that is based on the average pixel value of the G image and the average pixel value of the B image. For example, the first correction unit 150 may detect two points corresponding to each other in the G image and the B image. One of the two points is in the G image and the other of the two points is in the B image. The first correction unit 150 may calculate the first coefficient $\alpha$ for each pixel on the basis of pixel values of the two points. The first correction unit 150 may calculate a statistic on the basis of a histogram of pixel values of each of the G image and the B image or the like and calculate the first coefficient $\alpha$ on the basis of the statistic.

The first correction unit 150 may adjust the first coefficient $\alpha$ calculated as shown above. For example, the first correction unit 150 may adjust the first coefficient $\alpha$ calculated as shown above such that the first coefficient $\alpha$ is nonlinear with respect to a pixel value.

The first coefficient $\alpha$ may be calculated by using a method other than the above-described method. For example, the first coefficient $\alpha$ may be experimentally acquired from a result of correction processing using a plurality of first coefficients $\alpha$ that have been set in advance. The first coefficient $\alpha$ designated by a user may be set.

After the pixel value of the B' image is calculated, the first correction unit 150 may execute white balance adjustment processing if necessary.

The imaging apparatus 10b according to the third embodiment can suppress double images and improve visibility of an image as with the imaging apparatus 10 according to the first embodiment.

The first correction unit 150 corrects the G image used for the B channel. For this reason, color reproducibility of a subject is enhanced.

Fourth Embodiment

Figure 16:
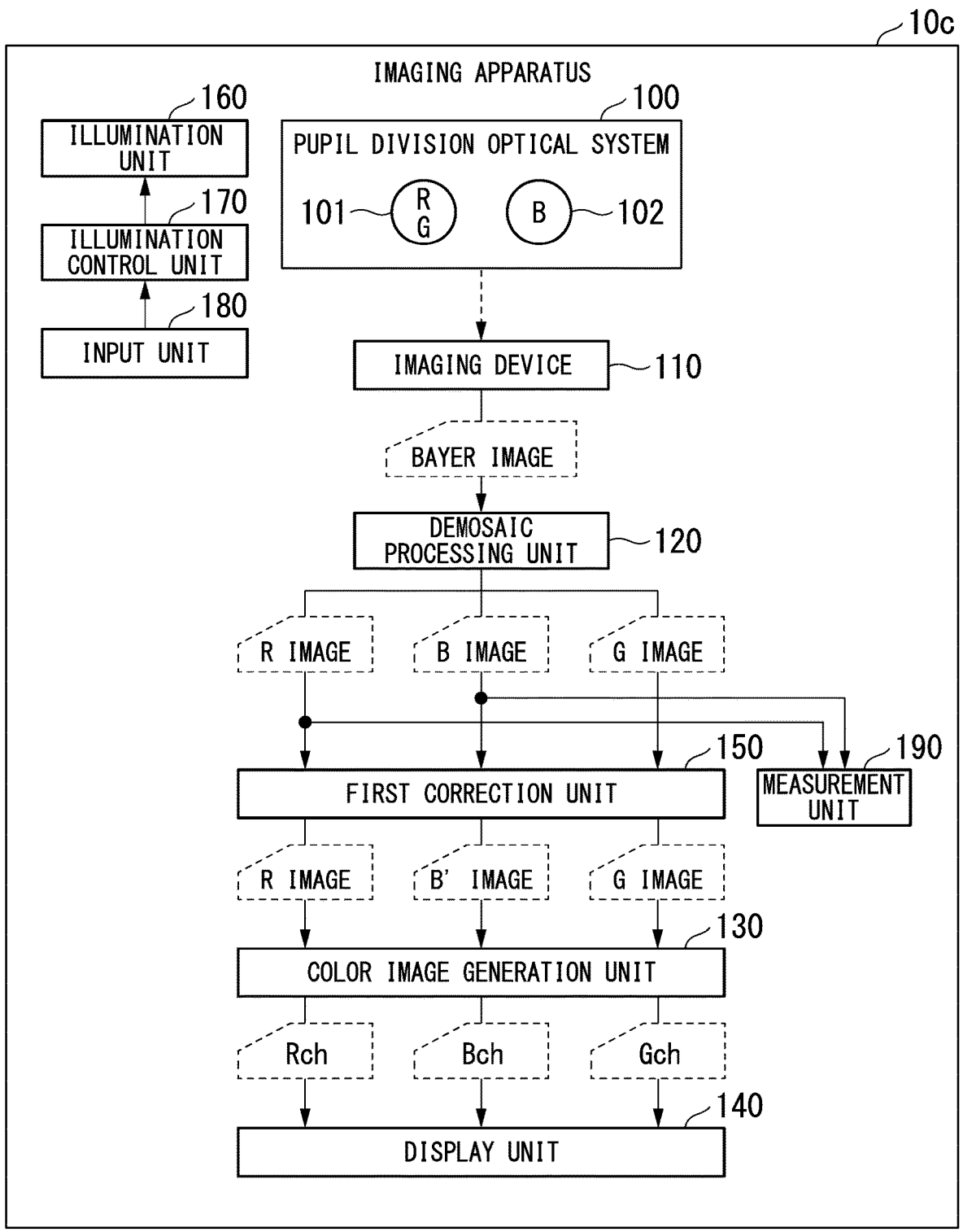
FIG. 16 is a block diagram showing a configuration of an imaging apparatus according to a fourth embodiment of the present invention.

FIG. 16 shows a configuration of an imaging apparatus 10c according to a fourth embodiment of the present invention. In terms of the configuration shown in FIG. 16, differences from the configuration shown in FIG. 15 will be described.

The imaging apparatus 10c includes an illumination unit 160, an illumination control unit 170, an input unit 180, and a measurement unit 190 in addition to the configurations shown in FIG. 15. In the first embodiment, there are cases in which double images occur due to color shift of an image that is based on components of illumination light. In the fourth embodiment, the double images are suppressed.

The illumination unit 160 generates illumination light for illuminating a subject. The illumination unit 160 is in one of a first state and a second state. When the illumination unit 160 is in the first state, the illumination unit 160 generates illumination light used for measurement. When the illumination unit 160 is in the second state, the illumination unit 160 generates illumination light used for observation.

When the illumination unit 160 is in the first state, the illumination unit 160 generates illumination light having a first peak of the amount of light in the transmission wavelength band (first wavelength band) of the RG filter of the first pupil 101 and having a second peak of the amount of light in the transmission wavelength band (second wavelength band) of the B filter of the second pupil 102. The transmission wavelength band of the RG filter of the first pupil 101 includes longer wavelengths than any wavelength included in the transmission wavelength band of the B filter of the second pupil 102. When the illumination unit 160 is in the first state, the amount of the illumination light at the shortest wavelength of the transmission wavelength band of the RG filter of the first pupil 101 is less than the amount of the illumination light at the first peak. When the illumination unit 160 is in the first state, the amount of the illumination light at the longest wavelength of the transmission wavelength band of the B filter of the second pupil 102 is less than the amount of the illumination light at the second peak.

Hereinafter, an example in which the two states of the illumination unit 160 are switched will be described. Illumination light used for measurement and illumination light used for observation may be the same.

The illumination unit 160 includes a light source. The light source is a light emitting device such as a light emitting diode (LED) or a laser diode (LD), The light source may be a xenon lamp to which a filter has been inserted. The light source is not limited to these. The light source has only to be configured to be able to limit a wavelength band of light.

The illumination control unit 170 controls the illumination unit 160. Specifically, the illumination control unit 170 switches between a first state in which the illumination unit 160 generates illumination light used for measurement and a second state in which the illumination unit 160 generates illumination light used for observation. When the illumination unit 160 is in the second state, the color image generation unit 130 generates the color image.

The input unit 180 accepts an instruction input by a user. Specifically, the input unit 180 accepts an instruction for observation or measurement. In addition, the input unit 180 accepts an instruction of a measurement point that is a position at which a phase difference is calculated. The input unit 180 notifies the illumination control unit 170 of the instruction input by a user. When the input unit 180 accepts the instruction for observation, the illumination control unit 170 controls the illumination unit 160 such that the illumination unit 160 is in the second state. When the input unit 180 accepts the instruction for measurement, the illumination control unit 170 controls the illumination unit 160 such that the illumination unit 160 is in the first state.

The input unit 180 is a user interface such as a button, a switch, a key, and a mouse. The input unit 180 and the display unit 140 may be constituted as a touch panel.

The R image and the B image generated by the demosaic processing unit 120 are input to the measurement unit 190. Alternatively, the G image and the B image generated by the demosaic processing unit 120 are input to the measurement unit 190. When the illumination unit 160 is in the first state, the measurement unit 190 calculates at least one of a phase difference between the R image (first signal) and the B image (third signal) and a phase difference between the G image (second signal) and the B image (third signal). The measurement unit 190 may calculate only a phase difference between the R image and the B image. The measurement unit 190 may calculate only a phase difference between the G image and the B image. The measurement unit 190 may calculate both a phase difference between the R image and the B image and a phase difference between the G image and the B image. When the input unit 180 accepts an instruction of a measurement point, the measurement unit 190 calculates a phase difference at the measurement point.

The measurement unit 190 calculates the distance of a subject on the basis of a phase difference. For example, when one arbitrary point on an image is designated by a user, the measurement unit 190 performs measurement of depth. When two arbitrary points on an image are designated by a user, the measurement unit 190 can measure the distance between the two points.

The illumination control unit 170 and the measurement unit 190 may be constituted by an ASIC, an FPGA, a microprocessor, and the like as with the demosaic processing unit 120 or the like.

In terms of points other than the above, the configuration shown in FIG. 16 is similar to the configuration shown in FIG. 15.

As shown in FIG. 7, the wavelength $\lambda_C$ is the boundary between the transmission wavelength band of the RG filter of the first pupil 101 represented by the line $F_{RG}$ and the transmission wavelength band of the B filter of the second pupil 102 represented by the line $F_B$. A wavelength near the wavelength $\lambda_C$ is included in the transmission wavelength band of the B filter CFb of the imaging device 110 represented by the line $f_B$. The B filter CFb transmits blue light transmitted through the RG filter of the first pupil 101 and blue light transmitted through the B filter of the second pupil 102. The blue light transmitted through the RG filter of the first pupil 101 is unnecessary light. The light causes double images (crosstalk) in the B image.

Due to the influence of the crosstalk, there is a possibility that the accuracy of measurement using a method in which a phase difference is acquired on the basis of two images deteriorates. It is ideal that components of illumination light have a peak within the transmission wavelength band of the RG filter of the first pupil 101 represented by the line $F_{RG}$ and have a peak within the transmission wavelength band of the B filter of the second pupil 102 represented by the line $F_B$, and components of illumination light are not included near the wavelength $\lambda_C$.

Figure 17:
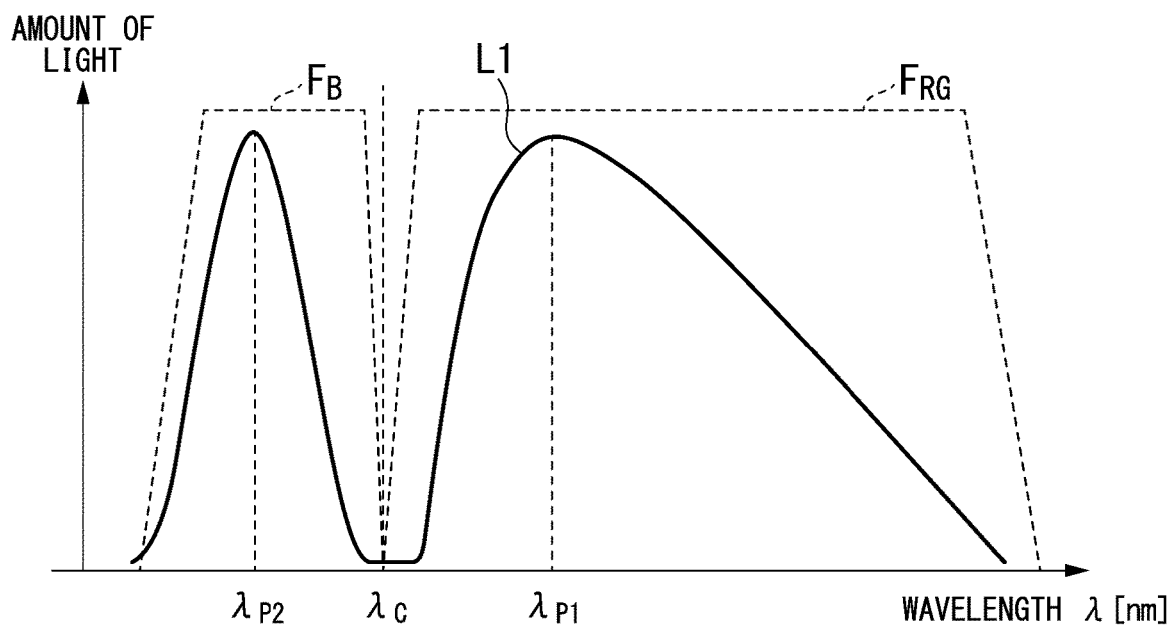
FIG. 17 is a diagram showing a first example of components of illumination light in the fourth embodiment of the present invention.

FIG. 17 shows a first example of components of illumination light. The horizontal axis in FIG. 17 represents a wavelength $\lambda$ [nm] and the vertical axis in FIG. 17 represents the amount of light. A line L1 represents components of illumination light used for measurement generated by the illumination unit 160 when the input unit 180 accepts the instruction for measurement. In FIG. 17, the line $F_{RG}$ represents components of light transmitted through the RG filter of the first pupil 101. The line $F_B$ represents components of light transmitted through the B filter of the second pupil 102.

As shown by the line L1, the amount of the illumination light has a first peak at a wavelength $\lambda_{P1}$ of the transmission wavelength band of the RG filter of the first pupil 101. The amount of the illumination light has a second peak at a wavelength $\lambda_{P2}$ of the transmission wavelength band of the B filter of the second pupil 102. The amount of the illumination light has a bottom between the wavelength $\lambda_{P1}$ and the wavelength $\lambda_{P2}$. The bottom of the amount of the illumination light is at the boundary part between the transmission wavelength band of the RG filter of the first pupil 101 and the transmission wavelength band of the B filter of the second pupil 102.

The amount of the illumination light at the shortest wavelength $\lambda_C$ of the transmission wavelength band of the RG filter of the first pupil 101 is less than the amount of the illumination light at the first peak. The amount of the illumination light at the longest wavelength $\lambda_C$ of the transmission wavelength band of the B filter of the second pupil 102 is less than the amount of the illumination light at the second peak. As the wavelength increases from the wavelength $\lambda_{P2}$ toward the wavelength $\lambda_C$, the amount of the illumination light decreases. As the wavelength increases from the wavelength $\lambda_C$, toward the wavelength $\lambda_{P1}$, the amount of the illumination light increases.

As shown in FIG. 8, the transmission wavelength band of the RG filter of the first pupil 101 and the transmission wavelength band of the B filter of the second pupil 102 may not overlap each other. In such a case, the amount of the illumination light at the shortest wavelength $\lambda_1$ of the transmission wavelength band of the RG filter of the first pupil 101 is less than the amount of the illumination light at the first peak. The amount of the illumination light at the longest wavelength $\lambda_2$ of the transmission wavelength band of the B filter of the second pupil 102 is less than the amount of the illumination light at the second peak.

As described above, the amount of the illumination light is small at the boundary part between the transmission wavelength band of the RG filter of the first pupil 101 and the transmission wavelength band of the B filter of the second pupil 102. For this reason, in the B image, components that are based on blue light transmitted through the RG filter of the first pupil 101 are reduced. Consequently, the crosstalk is suppressed in the B image and deterioration of the measurement accuracy is suppressed.

Figure 18:
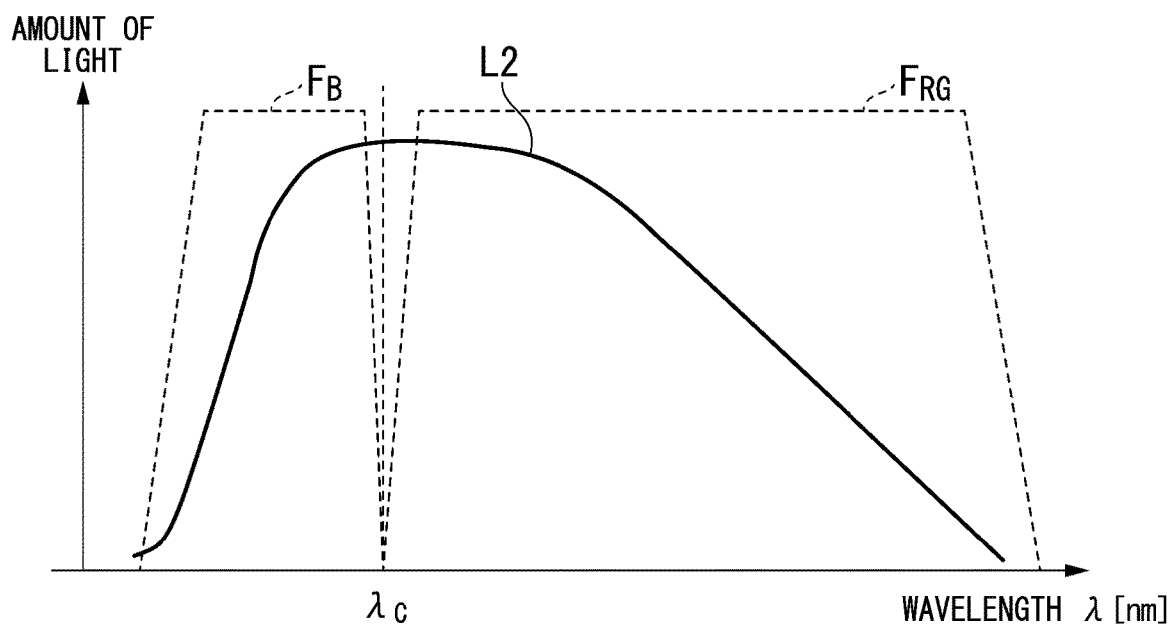
FIG. 18 is a diagram showing a second example of components of illumination light in the fourth embodiment of the present invention.

FIG. 18 shows a second example of components of illumination light. The horizontal axis in FIG. 18 represents a wavelength $\lambda$[nm] and the vertical axis in FIG. 18 represents the amount of light. A line L2 represents components of illumination light used for observation generated by the illumination unit 160 when the input unit 180 accepts the instruction for observation. In FIG. 18, the line $F_{RG}$ represents components of light transmitted through the RG filter of the first pupil 101. The line $F_B$ represents components of light transmitted through the B filter of the second pupil 102.

Components of the illumination light used for observation are different from components of the illumination light used for measurement. The amount of the illumination light used for observation at the shortest wavelength $\lambda_C$ of the transmission wavelength band of the RG filter of the first pupil 101 is greater than the amount of the illumination light used for measurement at the shortest wavelength $\lambda_C$ of the transmission wavelength band of the RG filter of the first pupil 101. The amount of the illumination light used for observation at the longest wavelength $\lambda_C$, of the transmission wavelength band of the B filter of the second pupil 102 is greater than the amount of the illumination light used for measurement at the longest wavelength $\lambda_C$ of the transmission wavelength band of the B filter of the second pupil 102, The wavelength at the peak of the amount of the illumination light used for observation may be any wavelength from the shortest wavelength of the transmission wavelength band of the B filter of the second pupil 102 to the longest wavelength of the transmission wavelength band of the RG filter of the first pupil 101.

When the illumination unit 160 is in the first state, the first correction unit 150 and the color image generation unit 130 may stop operations. In addition, when the illumination unit 160 is in the second state, the measurement unit 190 may stop operations. In this way, power consumption of the imaging apparatus 10c is reduced.

The imaging apparatus 10c may not include the illumination control unit 170. The illumination unit 160 may generate illumination light having the characteristics represented by the line L1 in FIG. 17 at the time of observation. The imaging apparatus 10c may not include the input unit 180. The illumination control unit 170 may switch states of the illumination control unit 170 on the basis of conditions such as time regardless of an instruction from a user. The imaging apparatus 10c may not include at least one of the first correction unit 150 and the measurement unit 190.

The imaging apparatus 10c may be an endoscope apparatus.

The imaging apparatus 10c according to the fourth embodiment can suppress double images and improve visibility of an image as with the imaging apparatus 10 according to the first embodiment.

The imaging apparatus 10c according to the fourth embodiment includes the illumination control unit 170. For this reason, the imaging apparatus 10c can switch between illumination light used for measurement and illumination light used for observation.

The illumination unit 160 generates illumination light having the characteristics shown in FIG. 17. For this reason, the imaging apparatus 40c can suppress deterioration of the measurement accuracy due to the crosstalk.

Fifth Embodiment

Figure 19:
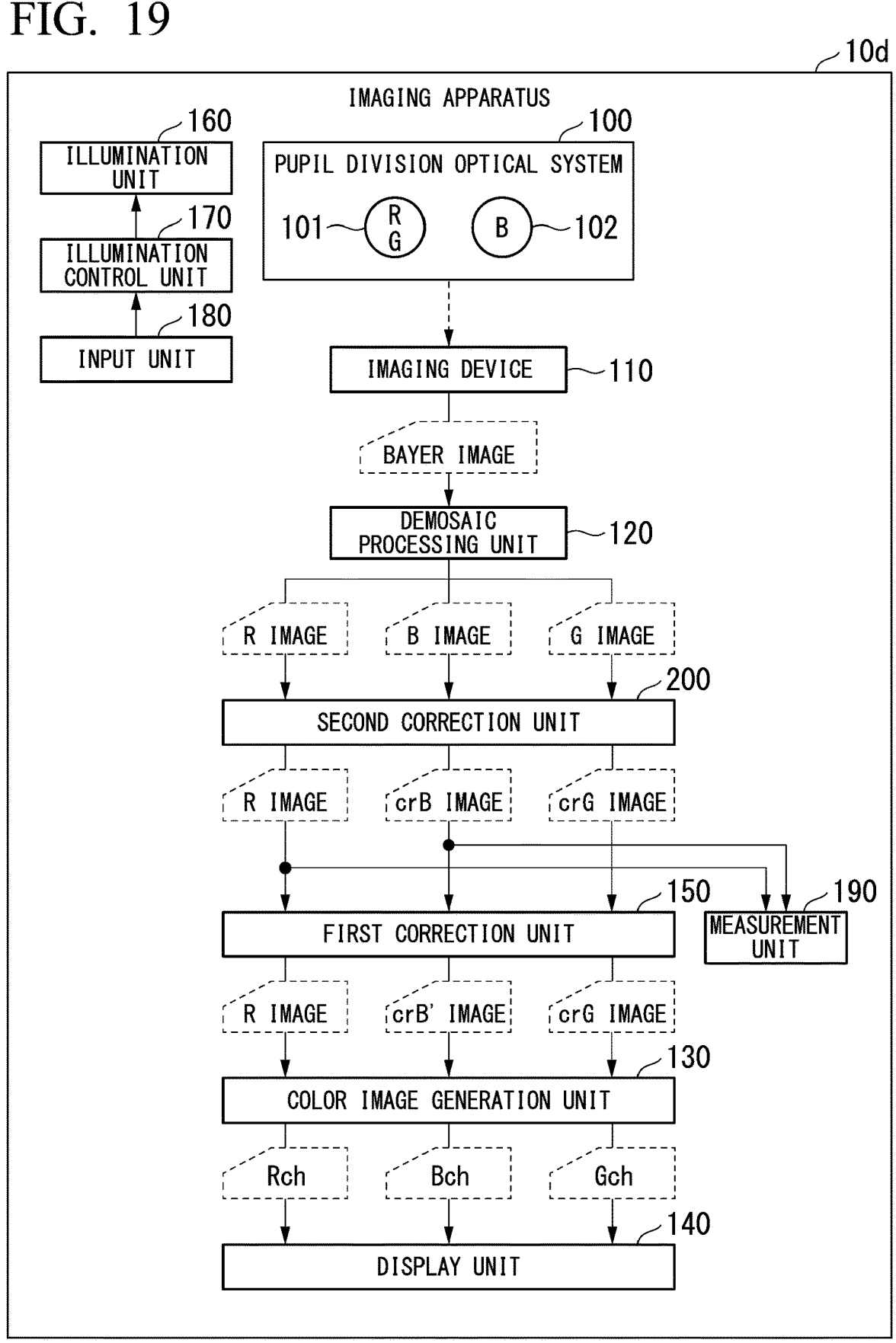
FIG. 19 is a block diagram showing a configuration of an imaging apparatus according to a fifth embodiment of the present invention.

FIG. 19 shows a configuration of an imaging apparatus 10d according to a fifth embodiment of the present invention. In terms of the configuration shown in FIG. 19, differences from the configuration shown in FIG. 16 will be described.

The imaging apparatus 10d includes a second correction unit 200 (crosstalk suppression unit) in addition to the configurations shown in FIG. 16. In the fifth embodiment, double images due to color shift of an image that is based on components of illumination light are more suppressed than those in the fourth embodiment.

The second correction unit 200 corrects at least one of a G image (second signal) and a B image (third signal) on the basis of the amount of components of illumination light, spectral characteristics (second transmittance characteristics) of the G filters CFgr and CFgb of the imaging device 110, and spectral characteristics (third transmittance characteristics) of the B filter CFb of the imaging device 110.

For example, the second correction unit 200 calculates a second coefficient on the basis of the amount of components of illumination light, the spectral characteristics of the G filters CFgr and CFgb of the imaging device 110, and the spectral characteristics of the B filter CFb of the imaging device 110, The second correction unit 200 multiplies the B image by the calculated second coefficient. The second correction unit 200 subtracts the B image multiplied by the second coefficient from the G image. In this way, the second correction unit 200 generates a crG image.

Alternatively, the second correction unit 200 calculates a third coefficient on the basis of the amount of components of illumination light, the spectral characteristics of the G filters CFgr and CFgb of the imaging device 110, and the spectral characteristics of the B filter CFb of the imaging device 110. The second correction unit 200 multiplies the G image by the calculated third coefficient. The second correction unit 200 subtracts the G image multiplied by the third coefficient from the B image. In this way, the second correction unit 200 generates a crB image.

The second correction unit 200 performs the above-described correction on the basis of the RGB image generated by the demosaic processing unit 120. The second correction unit 200 outputs the generated crG image and crB image to the first correction unit 150. In addition, the second correction unit 200 outputs the R image output from the demosaic processing unit 120 to the first correction unit 150. The R image output from the demosaic processing unit 120 may be input to the first correction unit 150 without passing through the second correction unit 200. The second correction unit 200 may be constituted by an ASIC, an FPGA, a microprocessor, and the like as with the demosaic processing unit 120 or the like.

The first correction unit 150 calculates a first coefficient on the basis of the crG image and the crB image and generates a crB' image by correcting the crG image to be used for a B channel on the basis of the calculated first coefficient. Specifically, the first correction unit 150 corrects the crG image output from the second correction unit 200 on the basis of the crG image and the crB image output from the second correction unit 200. In this way, the first correction unit 150 generates the crB' image. The first correction unit 150 outputs the generated crB' image to the color image generation unit 130. In addition, the first correction unit 150 outputs the R image and the crG image output from the second correction unit 200 to the color image generation unit 130. The R image and the crG image output from the second correction unit 200 may be input to the color image generation unit 130 without passing through the first correction unit 150.

The color image generation unit 130 generates a color image including the R image as an R channel, the crG image as a second channel, and the crB' image as a third channel.

In terms of points other than the above, the configuration shown in FIG. 19 is similar to the configuration shown in FIG. 16.

Figure 20:
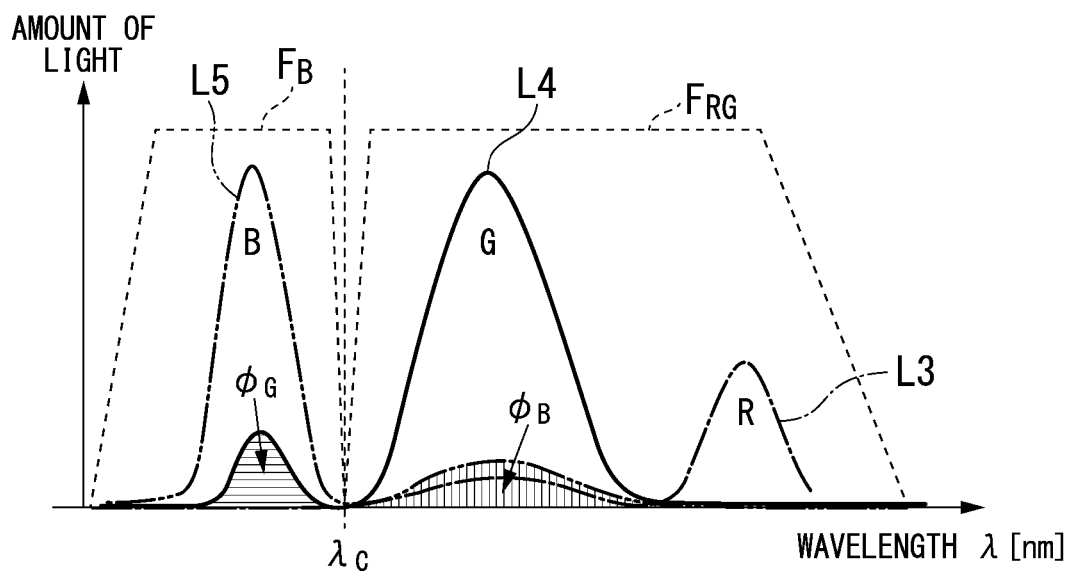
FIG. 20 is a diagram showing components of light transmitted through color filters of the imaging apparatus according to a fifth embodiment of the present invention.

FIG. 20 shows components of light transmitted through the color filter CF of the imaging device 110 when a subject is irradiated with illumination light having the characteristics represented by the line L1 in FIG. 17. The horizontal axis in FIG. 20 represents a wavelength [nm] and the vertical axis in FIG. 20 represents the amount of light. A line L3 represents components of light transmitted through the R filter CFr of the imaging device 110. A line L4 represents components of light transmitted through the G filters CFgr and CFgb of the imaging device 110. A line L5 represents components of light transmitted through the B filter CFb of the imaging device 110. In FIG. 20, a line $F_{RG}$ represents spectral characteristics of the RG filter of the first pupil 101. A line $F_B$ represents spectral characteristics of the B filter of the second pupil 102. A wavelength $\lambda_C$ is the boundary between the spectral characteristics of the RG filter of the first pupil 101 and the spectral characteristics of the B filter of the second pupil 102.

As shown in FIG. 20, the G filters CFgr and CFgb transmit green light transmitted through the RG filter of the first pupil 101 and green light transmitted through the B filter of the second pupil 102. The green light transmitted through the B filter of the second pupil 102 is unnecessary light. The light causes double images (crosstalk) in the G image. In FIG. 20, a region $\varphi_G$ represents components of green light transmitted through the B filter of the second pupil 102.

The B filter CFb transmits blue light transmitted through the RG filter of the first pupil 101 and blue light transmitted through the B filter of the second pupil 102. The blue light transmitted through the RG filter of the first pupil 101 is unnecessary light. The light causes double images (crosstalk) in the B image. In FIG. 20, a region $\varphi_B$ represents components of blue light transmitted through the RG filter of the first pupil 101.

The second correction unit 200 corrects a pixel value a region of one or more pixels in the G image through first crosstalk suppression processing. Specifically, the second correction unit 200 calculates a second coefficient β by using following expression (3).

$$\beta = Ib \times (Sg1/Sb1) \quad (3)$$

Ib in expression (3) represents components of illumination light within the transmission wavelength band of the B filter of the second pupil 102. Sg1 in expression (3) represents spectral sensitivity of the G pixel of the imaging device 110 with respect to light within the transmission wavelength band of the B filter of the second pupil 102. The spectral sensitivity of the G pixel is based on the spectral characteristics of the G filters CFgr and CFgb. Sb1 in expression (3) represents spectral sensitivity of the B pixel of the imaging device 110 with respect to light within the transmission wavelength band of the B filter of the second pupil 102. The spectral sensitivity of the B pixel is based on the spectral characteristics of the B filter CFb.

As shown in expression (3), the second correction unit 200 calculates a ratio of the spectral sensitivity of the G pixel to the spectral sensitivity of the B pixel. The second correction unit 200 calculates the second coefficient β by multiplying the components of illumination light within the transmission wavelength band of the B filter of the second pupil 102 by the ratio. The second correction unit 200 calculates a pixel value of the crG image by using following expression (4).

$$crGg = Gg - \beta \times Bb \quad (4)$$

crGg in expression (4) represents a pixel value of the crG image. Gg in expression (4) represents a pixel value of the G image. Bb in expression (4) represents a pixel value of the B image. As shown in expression (4), the second correction unit 200 calculates the pixel value of the crG image by subtracting the pixel value of the B image multiplied by the second coefficient β from the pixel value of the G image.

The second correction unit 200 corrects a pixel value in a region of one or more pixels in the B image through second crosstalk suppression processing. Specifically, the second correction unit 200 calculates a third coefficient γ by using following expression (5).

$$\gamma = Irg \times (Sb2/Sg2) \quad (5)$$

Irg in expression (5) represents components of illumination light within the transmission wavelength band of the RG filter of the first pupil 101. Sb2 in expression (5) represents spectral sensitivity of the B pixel of the imaging device 110 with respect to light within the transmission wavelength band of the RG filter of the first pupil 101. Sg2 in expression (5) represents spectral sensitivity of the G pixel of the imaging device 110 with respect to light within the transmission wavelength band of the RG filter of the first pupil 101.

As shown in expression (5), the second correction unit 200 calculates a ratio of the spectral sensitivity of the B pixel to the spectral sensitivity of the G pixel. The second correction unit 200 calculates the third coefficient γ by multiplying the components of illumination light within the transmission wavelength hand of the RG filter of the first pupil 101 by the ratio. The second correction unit 200 calculates a pixel value of the crB image by using following expression (6).

$$crBb = Bb - \gamma \times Gg \quad (6)$$

crBb in expression (6) represents a pixel value of the crB image. Bb in expression (6) represents a pixel value of the B image. Gg in expression (6) represents a pixel value of the G image. As shown in expression (6), the second correction unit 200 calculates the pixel value of the crB image by subtracting the pixel value of the G image multiplied by the third coefficient γ from the pixel value of the B image.

In expression (6), instead of the pixel value Gg of the G image, the pixel value crGg of the crG image calculated by using expression (4) may be used. In expression (4), instead of the pixel value Bb of the B image, the pixel value crBb of the crB image calculated by using expression (6) may be used.

Through the above-described processing, crosstalk in the G image and crosstalk in the B image are suppressed.

The second correction unit 200 may correct only one of the G image and the B image. The second correction unit 200 may adjust the second coefficient β and the third coefficient γ as calculated above. For example, the second correction unit 200 may adjust the second coefficient β as calculated above such that the second coefficient β is nonlinear with respect to a pixel value. The second correction unit 200 may adjust the third coefficient γ as calculated above such that the third coefficient γ is nonlinear with respect to a pixel value.

The second coefficient β and the third coefficient γ may be calculated by using a method other than the above-described method. For example, the second coefficient β may be experimentally acquired from a result of the first crosstalk suppression processing using a plurality of second coefficients β that have been set in advance. The second coefficient β designated by a user may be set. The third coefficient γ may be experimentally acquired from a result of the second crosstalk suppression processing using a plurality of third coefficients γ that have been set in advance.

The RGB image generated by the demosaic processing unit 120 may be input to the first correction unit 150. In such a case, the processing executed by the first correction unit 150 is similar to the processing executed by the first correction unit 150 in the imaging apparatus 10*b* shown in FIG. 15 and the imaging apparatus 10*c* shown in FIG. 16.

When the illumination unit. 160 is in the first state, the first correction unit 150 and the color image generation unit 130 may stop operations. In addition, when the illumination unit 160 is in the second state, the measurement unit 190 may stop operations. In this way, power consumption of the imaging apparatus 10*d* is reduced.

The imaging apparatus 10*d* may not include the illumination control unit 170. The illumination unit 160 may generate illumination light having the characteristics represented by the line L1 in FIG. 17 at the time of observation. The imaging apparatus 10*d* may not include the input unit 180. The illumination control unit 170 may switch states of the illumination control unit 170 on the basis of conditions such as time regardless of an instruction from a user. The imaging apparatus 10*d* may not include at least one of the first correction unit 150 and the measurement unit 190.

The imaging apparatus 10*d* may be an endoscope apparatus.

The imaging apparatus 10*d* according to the fifth embodiment can suppress double images and improve visibility of an image as with the imaging apparatus 10 according to the first embodiment.

The second correction unit 200 corrects at least one of the G image and the B image. For this reason, the imaging apparatus 10*d* can suppress deterioration of the measurement accuracy due to the crosstalk.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging apparatus comprising:
a pupil division optical system including a first pupil transmitting light of a first wavelength band and a second pupil transmitting light of a second wavelength band different from the first wavelength band, an amount of components of a transmission wavelength band of first transmittance characteristics overlapping the first wavelength band being more than an amount of components of a transmission wavelength band of the first transmittance characteristics overlapping the second wavelength band, an amount of components of a transmission wavelength band of second transmittance characteristics overlapping the first wavelength band being more than an amount of components of a transmission wavelength band of the second transmittance characteristics overlapping the second wavelength band, an amount of components of a transmission wavelength band of third transmittance characteristics overlapping the second wavelength band being more than an amount of components of a transmission wavelength band of the third transmittance characteristics overlapping the first wavelength band, the first transmittance characteristics, the second transmittance characteristics, and the third transmittance characteristics being different from each other;
an imaging sensor configured to:
generate a first signal by capturing an image of light transmitted through the pupil division optical system and a first color filter having the first transmittance characteristics;
generate a second signal by capturing an image of light transmitted through the pupil division optical system and a second color filter having the second transmittance characteristics; and
generate a third signal by capturing an image of light transmitted through the pupil division optical system and a third color filter having the third transmittance characteristics; and
a processor comprising hardware, the processor being configured to:
generate a color image including the first signal as a first channel and the second signal as a second channel and a third channel;
calculate a first coefficient on the basis of the second signal and the third signal;
generate a fourth signal by correcting, on the basis of the calculated first coefficient, the second signal used for the third channel;
generate the color image including the first signal as the first channel, the second signal as the second channel, and the fourth signal as the third channel; and
output the generated color image to a display.

2. An imaging apparatus comprising:
a pupil division optical system including a first pupil transmitting light of a first wavelength band and a second pupil transmitting light of a second wavelength band different from the first wavelength band, an amount of components of a transmission wavelength band of first transmittance characteristics overlapping the first wavelength band being more than an amount of components of a transmission wavelength band of the first transmittance characteristics overlapping the second wavelength band, an amount of components of a transmission wavelength band of second transmittance characteristics overlapping the first wavelength band being more than an amount of components of a transmission wavelength band of the second transmittance characteristics overlapping the second wavelength band, an amount of components of a transmission wavelength band of third transmittance characteristics overlapping the second wavelength band being more than an amount of components of a transmission wavelength band of the third transmittance characteristics overlapping the first wavelength band, the first transmittance characteristics, the second transmittance characteristics, and the third transmittance characteristics being different from each other;
an imaging sensor configured to:
generate a first signal by capturing an image of light transmitted through the pupil division optical system and a first color filter having the first transmittance characteristics;
generate a second signal by capturing an image of light transmitted through the pupil division optical system and a second color filter having the second transmittance characteristics; and
generate a third signal by capturing an image of light transmitted through the pupil division optical system and a third color filter having the third transmittance characteristics;

a processor comprising hardware, the processor being configured to generate a color image including the first signal as a first channel and the second signal as a second channel and a third channel and configured to output the generated color image to a display; and a light emitting device configured to generate illumination light having a first peak of an amount of light in the first wavelength band and having a second peak of an amount of light in the second wavelength band.

3. The imaging apparatus according to claim 2, wherein the first wavelength band includes longer wavelengths than any wavelength included in the second wavelength band, an amount of the illumination light at the shortest wavelength of the first wavelength band is less than the amount of the illumination light at the first peak, and an amount of the illumination light at the longest wavelength of the second wavelength band is less than the amount of the illumination light at the second peak.

4. The imaging apparatus according to claim 2, wherein the processor is configured to correct at least one of the second signal and the third signal on the basis of an amount of components of illumination light, the second transmittance characteristics, and the third transmittance characteristics.

5. The imaging apparatus according to claim 4, wherein the processor is configured to:

calculate a second coefficient on the basis of the amount of the components of the illumination light, the second transmittance characteristics, and the third transmittance characteristics;

multiply the third signal by the calculated second coefficient; and subtract the third signal multiplied by the second coefficient from the second signal.

6. The imaging apparatus according to claim 4, wherein the processor is configured to:

calculate a third coefficient on the basis of the amount of the components of the illumination light, the second transmittance characteristics, and the third transmittance characteristics;

multiply the second signal by the calculated third coefficient; and subtract the second signal multiplied by the third coefficient from the third signal.

7. The imaging apparatus according to claim 2, wherein the processor is configured to:

switch between a first state in which the light emitting device generates the illumination light used for measurement and a second state in which the light emitting device generates the illumination light used for observation, and calculate at least one of a phase difference between the first signal and the third signal and a phase difference between the second signal and the third signal when the light emitting device is in the first state.

\* \* \* \* \*